(12) United States Patent
Boemi et al.

(10) Patent No.: US 10,659,240 B2
(45) Date of Patent: May 19, 2020

(54) MOBILE POWER, DATA AND LIGHTING SYSTEM

(71) Applicant: Electrical Engineering Solutions Pty Ltd, Kenthurst (AU)

(72) Inventors: Norman Samuel Boemi, Kenthurst (AU); Damien Dunphy, Dural (AU); Stephen Warjabedian, Oatlands (AU)

(73) Assignee: Electrical Engineering Solutions PTY LTD, Kenthurst, NSW (AU)

( * ) Notice: Subject to any disclaimer, the term of this patent is extended or adjusted under 35 U.S.C. 154(b) by 0 days.

(21) Appl. No.: 15/764,802

(22) PCT Filed: Sep. 29, 2016

(86) PCT No.: PCT/AU2016/000334
§ 371 (c)(1),
(2) Date: Mar. 29, 2018

(87) PCT Pub. No.: WO2017/054030
PCT Pub. Date: Apr. 6, 2017

(65) Prior Publication Data
US 2018/0294982 A1    Oct. 11, 2018

(30) Foreign Application Priority Data

Sep. 29, 2015 (AU) ............... 2015903948
Nov. 4, 2015 (AU) ............... 2015904505
(Continued)

(51) Int. Cl.
*H01R 13/52*    (2006.01)
*H04L 12/10*    (2006.01)
(Continued)

(52) U.S. Cl.
CPC ............. *H04L 12/10* (2013.01); *H01R 13/52* (2013.01); *H01R 24/64* (2013.01); *H01R 25/006* (2013.01);
(Continued)

(58) Field of Classification Search
CPC ............... H04L 12/10; H04L 12/40045; H04L 12/40032; H01R 24/64; H01R 13/52;
(Continued)

(56) References Cited

U.S. PATENT DOCUMENTS

2012/0271477 A1* 10/2012 Okubo ................... H04L 12/10
700/297
2014/0293994 A1* 10/2014 Pepe ...................... H01B 11/22
370/352
(Continued)

*Primary Examiner* — Syed Haider
(74) *Attorney, Agent, or Firm* — Douglas J. Ryder; Ryder, Mazzeo & Konieczny LLC

(57) ABSTRACT

The present invention includes a mobile data power and lighting distribution station (10) and a data, power and lighting distribution system (250). The Station (10) has a plurality of power over ethernet sources (114, 136, 156) for powering LED lights (178, 190, 192, 204) and for providing 240 V AC power via charging station 216 and conversion module 228. Station 10 also communicates data/network connectivity for communicating with IP enabled devices including cameras (196), sensors (198, 166, 200) and for communicating and controlling access control systems (202). Station 10 is controlled via touchscreen (116) or remotely via web based interface made available via local wireless network (118) or via a telecommunications network (126) including the internet (128). The invention also encompasses driverless LED light fixtures controlled directly from the station (10) as well as DALI enabled Ethernet powered LED light fixtures.

24 Claims, 19 Drawing Sheets

(30) Foreign Application Priority Data

| Dec. 18, 2015 | (AU) | ................................ | 2015905273 |
|---|---|---|---|
| Feb. 3, 2016 | (AU) | ................................ | 2016100103 |
| Mar. 23, 2016 | (AU) | ................................ | 2016901102 |
| Aug. 3, 2016 | (AU) | ................................ | 2016903050 |
| Sep. 26, 2016 | (AU) | ................................ | 2016903888 |

(51) Int. Cl.

| *H04L 12/40* | (2006.01) |
|---|---|
| *H01R 24/64* | (2011.01) |
| *H01R 25/00* | (2006.01) |
| *H05B 37/02* | (2006.01) |
| *H02B 1/52* | (2006.01) |
| *H01R 107/00* | (2006.01) |
| *H04Q 1/02* | (2006.01) |

(52) U.S. Cl.
CPC .. *H04L 12/40032* (2013.01); *H04L 12/40045* (2013.01); *H05B 37/0263* (2013.01); *H01R 2107/00* (2013.01); *H02B 1/52* (2013.01); *H04Q 1/11* (2013.01); *H04Q 1/13* (2013.01)

(58) Field of Classification Search
CPC .............. H01R 25/006; H01R 2107/00; H05B 37/0263; H02B 1/52; H04Q 1/13; H04Q 1/11

See application file for complete search history.

(56) References Cited

U.S. PATENT DOCUMENTS

| 2015/0163881 A1* | 6/2015 | Pederson | ........... H05B 33/0863 315/154 |
|---|---|---|---|
| 2016/0020858 A1* | 1/2016 | Sipes, Jr. | ............. H04B 10/808 398/45 |

\* cited by examiner

MOBILE POWER, DATA AND LIGHTING SYSTEM

TECHNICAL FIELD

The present invention relates principally to a power and data distribution station used in a system of components used to distribute power, data and lighting. Particularly it is suited to uses in the building and construction industry with respect to the provision of temporary power, lighting and data solutions using the distribution station of the present invention.

BACKGROUND ART

It will be clearly understood that, if a prior art publication is referred to herein, this reference does not constitute an admission that the publication forms part of the common general knowledge in the art in Australia or in any other country.

Construction sites need power in order for the building to be built and/or fitted out. Contractors have to provide safe power and to take into consideration grounding, shock hazards, short circuit considerations, vault currents and safety. There are two ways to provide electricity to a construction site: grid power or generated power. Power supply cables can be run to the main electrical panel of an existing facility or power can be provided by gas- or diesel-powered generators, which are generally stand-alone portable units.

Once power is provided to a site (by grid or by generator) it needs to be distributed for lighting and also for powering tools. This can be achieved by the construction of various distribution panels and temporary electrical wiring for taking the power to where it is needed on site. Not only are the high voltage circuits and cables required for powering tools and lights, they are also used to provide data connectivity to the building site. Today's building sites are often highly connected in terms of network connectivity. Internet access is likely to be a requirement for builders working on the site. Also other gear such as IP security cameras and access control systems need to operate. All of this equipment relies on high voltage power sources or at the very least, other network peripherals that requires high voltage power sources.

The conventional approach to wiring and provisioning a building site brings with it many risks. In particular, there are great risks associated with electrocution. In construction sites, the temporary high voltage cables pose an electrocution risk to the licensed electricians who install and remove the high voltage cables as well as by other trades and builders who may inadvertently cut the cables and electrocute themselves during the building process. On average 3 Australian builders a year are electrocuted on building sites and many more are badly injured.

In addition to the risk of electrocution, high voltage cables represent a fire risk. This is particularly so if substandard cabling is installed, which is often difficult to detect in today's building services environment, where much product is imported into Australia of dubious quality.

In addition to the risks of death, injury and property damage, there comes the associated costs of mitigating these risks. There are voluminous standards that are set out by various bodies that detail how electrical work should be conducted with respect to high voltage power and its uses in construction. The regimes instituted by the various bodies responsible for maintaining standards in electrical services sector are costly to adhere to. This includes the mandatory use of licensed electricians to do any work with respect to high voltage power lines and lighting circuits.

Because of the particular needs of the construction industry, including various requirements for simplicity, replicability, robustness and ease of use, the problems associated with high voltage wires have gone unsolved, if not undetected by the vast majority of builders who have subconsciously accepted the risks posed by high voltage electricity in the workplace as unavoidable when the risks are in fact avoidable.

It is an object of the present invention to at least ameliorate the problems associated with the use of high voltage cabling in building and construction sites. Preferably the systems, methods and apparatus of the present invention will substantially lessen the use of high voltage cables in construction sites.

SUMMARY OF INVENTION

The present invention is directed to a system for the distribution of power for temporary lighting and general use, which may at least partially overcome at least one of the abovementioned disadvantages or provide the consumer with a useful or commercial choice.

With the foregoing in view, the present invention in a first embodiment of a first aspect of the invention, resides broadly in a mobile power distribution station wherein the station comprises at least one enclosure containing:
  low voltage power over Ethernet power source
  patch panel of weatherproof RJ-45 jacks and wherein at least one of the weatherproof RJ-45 jacks provides at least 100 W of available low voltage power for transmission to at least one connected device.

Preferably the at least one weatherproof RJ-45 jacks provides a minimum of 150 W of available low voltage power for transmission to at least one connected device.

More preferably the at least one weatherproof RJ-45 jacks provides a minimum of 200 W of available low voltage power for transmission to at least one connected device.

Still more preferably the low voltage power over Ethernet power source comprises one or more POE enabled switches, routers or high powered midspan devices.

Preferably the low voltage power over Ethernet power source comprises one or more POE enabled switches and one or more high powered mid span devices and wherein at least one RJ-45 jacks is connected to the POE switch and at least one of the RJ-45 jacks is connected to at least one high power midspan device.

More preferably a plurality of high powered mid span devices provide power to plurality of the RJ-45 jacks for distribution to connected devices.

Preferably the low voltage power over Ethernet power source derives its power from a DC power source device.

Preferably the DC power source device is a DC power supply powered by high voltage AC power.

Alternatively the DC power source device is a DALI LED driver powered by 240V AC power and wherein the low voltage power provided by the DALI LED driver contains overlayed upon it, a DALI control signal.

Preferably the DALI control signal is generated by a lighting controller of the station.

More preferably the DALI control signals are output over a low voltage DALI control signal bus from an output of the station.

Preferably the low voltage power over Ethernet power source comprises one or more POE enabled switches and one or more high powered mid span devices and wherein the station further includes a PC/microprocessor in connection with the at least one POE switch.

More preferably the one or more high powered mid span devices have their Ethernet input or inputs connected to ports on the at least one POE switch.

Still more preferably the PC/microprocessor is configured to control the operation of any devices connected by Ethernet to any of the station RJ-45 jacks.

Preferably controlling connected devices including powering and depowering the connected devices.

Preferably controlling connected devices utilises a I/O module under the control of the PC/microprocessor.

More preferably the station has at least one RJ-45 jack which is connected to the inputs of the I/O device for connecting sensors and/or switches by way of an Ethernet cable.

Still more preferably the sensors are taken from the list of motion sensors (PIR), CO, Temperature, Smoke, Fire or gas detectors.

Preferably the PC/microprocessor is configured to perform a function or control the connected devices based upon sensed inputs.

Preferably at least one RJ-45 jack is configured to receive a data network connection and supply it to one of the at least one POE switches.

Preferably the station further comprises a wifi access point and/or 3G/4G module in communication with the at least one POE switch for connecting user devices to the station.

Preferably the user devices access a control interface generated by the PC/microcontroller.

More preferably the control interface is provided by a webserver of the PC/microprocessor and wherein the user devices access the control interface through a web browser or dedicated application.

Still more preferably the control interface is only available to authorised users.

Preferably the station has at least two enclosures comprising a main enclosure for all of the components of the station and a patch panel enclosure for accessing the patch panel containing the plurality of RJ-45 jacks.

Still more preferably the main enclosure is not user accessible.

Preferably the patch panel enclosure is lockable to prevent unauthorised access.

Preferably the station has handles, wheels or castors for moving the station and optionally a mounting bracket for mounting the station.

According to a second aspect of the invention there is provided a power and lighting distribution system comprising at least one station connected to at least one ethernet LED light fixture having an ethernet port for powering the LED's that form part of the ethernet LED light fixture.

Preferably the at least one Ethernet LED light fixture is a driverless light fixture which is powered directly from the DC power delivered by the ethernet connection.

Still more preferably the at least one Ethernet LED light fixture is a maintained light fixture comprising an inverter, battery and one or more LEDs and wherein the inverter is configured to supply power from the battery when there is a loss of power supplied by the ethernet connection.

Alternatively the at least one Ethernet LED light fixture is a sustained light fixture comprising an inverter, battery at least one powered LED and at least one emergency LED and wherein the inverter is configured to supply power from the battery to the emergency LED when there is a loss of power supplied by the ethernet connection.

Preferably the LED or LEDs are arranged in constant voltage LED strips.

More preferably the LED or LED's are arranged in an at least one constant current LED strip and wherein the fixture further comprises a DC/DC step down convertor for producing a constant current power supply for the at least one constant current LED strip.

Preferably the at least one Ethernet LED light fixture utilises a POE splitter for isolating the DC power for powering the light fixture.

Still more preferably the at least one Ethernet LED light fixture's ethernet port provides 8 wires, the four positives and the four negatives being joined together to form a simple positive and negative DC power supply for powering the ethernet LED light fixture.

Preferably the at least one Ethernet LED light fixture comprises at least two light fixtures and where at least one provides a second ethernet jack for daisychaining and powering the second.

Still more preferably a string of at least 5 Ethernet LED light fixtures are daisychained via the second ethernet jacks of the light fixtures and wherein the daisychained fixtures are connected to a high power POE connection of the station.

Preferably controlling the at least one Ethernet LED light fixtures involves the PC/microcontroller using the I/O device to cut the power to the string of LED light fixtures.

Preferably the at least one Ethernet LED light fixture is a DALI Ethernet LED light fixture comprising an DALI driver that receives a combined DC power and DALI signal from the ethernet connection and whish supplies the power to the LEDs of the light fixture and wherein the LED driver is configured to be addressed by a lighting controller and thereby control the operation of the light fixture.

Preferably the at least one Ethernet LED light fixture takes the form of any of a batten, a downlight, an emergency exit or floodlight form factors.

Still more preferably the power and lighting distribution system comprised at least one station connected to a charging station via a plurality of high powered low voltage ethernet connections and wherein the charging station provides a supply of high voltage AC power.

Preferably the charging station provides USB ports for powering USB devices.

Still more preferably the charging station provides ethernet ports for communication back to the station and optionally to a wider area network or the internet.

Preferably the power and lighting distribution system comprises at least one station connected to a conversion module for taking a plurality of high power low voltage ethernet connections and outputting high voltage AC power via at least one soft wiring adaptor or plug.

Still more preferably a plurality of general power outlets are provided by connecting to the at least one soft wiring adaptor or plug.

Still more preferably a plurality of data/networking ethernet connections are made available from the module for connecting remote data devices back to the station.

According to a third aspect of the invention there is provided a method of providing a temporary lighting system to a construction site where in the method comprises:
 (i) delivering a station to a construction site;
 (ii) connecting the station to a source of high voltage AC power (iii) connecting a plurality of weatherproof ethernet cables to the plurality of weatherproof RJ45 ports on the station;

(iv) connecting the ethernet cables to a plurality of LED light fixtures via weatherproof RJ45 ports on the LED light fixtures.

Preferably the method further comprises turning the light fixtures on or off using the I/O device under the control of the PC/microprocessor.

According to a fourth aspect of the invention there is provided a method of providing high voltage AC power to remote devices using station wherein the method comprises connecting a plurality of high power ethernet connections from the high power midspans in station to a charging station and/or conversion module where an inverter or inverters of the conversion module convert the plurality of low power DC inputs into high voltage AC power for use by the remote devices.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
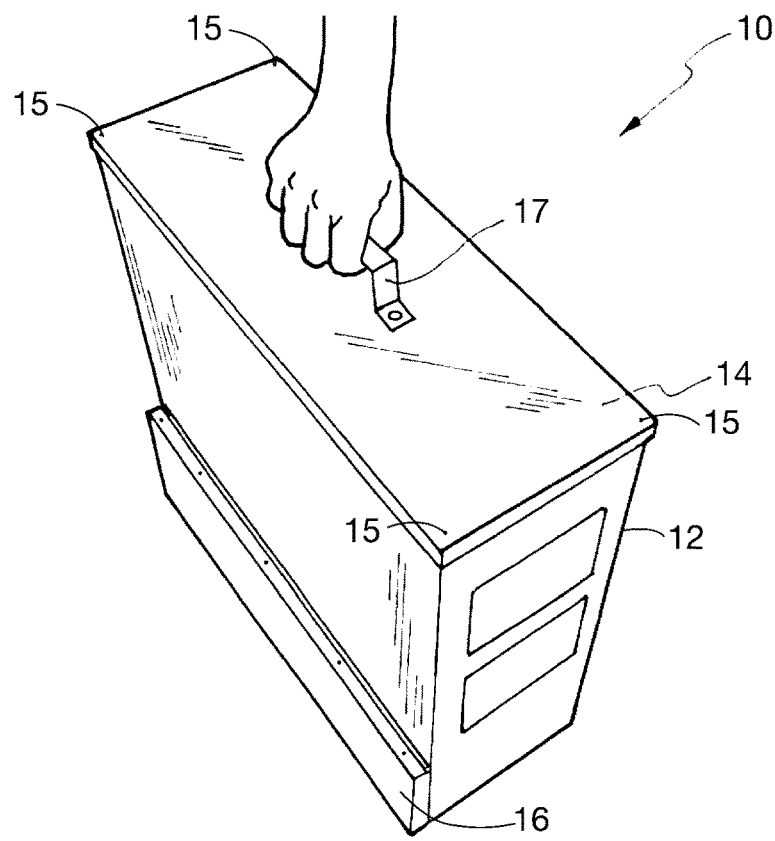
FIG. 1 is a perspective view of a station comprising the first embodiment of the first aspect of the invention.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications including combination of features from alternate embodiments of the invention.

References made to constructions sites should also be taken as a reference to other situations or places where they may not be sufficient infrastructure to provide certain services and where the device of the present invention will have some application. In particular concert sites and sites of other cultural activities, particularly if put on in a greenfield situation, would benefit from the use of the present invention.

Power Over Ethernet Technologies

Many devices that need power on a construction site do not need a high voltage power source to perform their function. The solution to many of the abovestated risks associated with high voltage cables involves replacing them with low voltage ethernet cabling. Accidentally cutting an ethernet cable carrying low voltage current will not cause electrocution or injury.

Ethernet cables are network cables that are used to connect one network device to another. They were initially developed to connect computers via RJ-45 ports. They contain 4 twisted pairs of wires. Ethernet cables have been around since the 1980's. It wasn't until the late 1990's that companies began experimenting with systems that involved sending power down one or more of the twisted pairs and data on the remaining twisted pairs so that a connected device could be simultaneously powered and networked via the single power over Ethernet (POE or PoE) connection.

A device that provided a POE connection is known as a power source device or power source unit. They may include POE switches or routers that provide both the networking and power in the one device. These are quite common today. In addition to POE switches and routers are the POE injectors or mid spans. These devices take a non-POE Ethernet connection (data) and a source of DC power to be consumed by the connected device and combines them into a POE connection. In the present specification a reference to a POE power source includes both POE switches and routers and also non-PoE switch/router when combined with one or more PoE Injectors/midspan devices that introduce power into non PoE ethernet connections.

Various standards have been ratified over the years which has fostered the uptake of the technology by peripheral manufacturers and other technology providers. One of the main features of POE connections to be agreed upon are the total available power per POE connection. The now outdated PoE standard IEEE 802.3af-2003 (which is herein incorporated by reference) only provided up to 15.4 W per connection. The maximum power supplied per port in a system compliant with IEEE 802.3at-2009 is 30 W. Future standards such as 802.3bt will allow up to 100 W per connection to be provided by utilising all four twisted pair cables within the ethernet cable. IEEE standards referred to herein are hereby incorporated by reference.

In the meantime as discussed below, there are various nascent and/or non-standard systems that provide considerably higher powered connections of up to 150 W per connection.

Companies such as Cisco provide a proprietary switch (Cisco UPOE) capable of delivering 60 W per connection using two twisted pairs within each cable. Phihong USA Corporation produces midspans or PoE injectors that work on an "Ultra PoE" rating in which up to 60 W-80 W are delivered per connection. Phihong also manufacture "Mega PoE" midspans or PoE injectors that provide up to 90 W PoE. For example the 150 W POE INJ 1000—DinX Gigabit POE injector/splitter sold by Tycon Power Systems operates as both a mid span injector and splitter where up to 150 W can be inserted or extracted from an Ethernet network connection.

Tycon Power Systems from Bluffdale Utah also produce a mini PoE switch that takes a single PoE connection and divides the power supplied by it over 4 outlet PoE ports with a maximum outlet power rating of 35 W per port. As LED light can draw relatively small amounts of power (as little as 10 W-20 W), a single connection from a high powered POE system such as the one provided by Tycon power's 150 W injector can power a plurality of LED lights using essentially one length of cable.

It is important when using the high powered POE devices that a compatible cable is utilised. In the present invention the minimum standard cable that can be incorporated are Cat 5, Cat 5e, Cat 5+ Cat 6, Cat 6a, Cat 7 cables. More preferably Cat 5e-Cat 7 cables are employed.

The sorts of devices that can be directly powered by POE connections include:
  LED/halogen/fluorescent lights;
  VoIP phones;
  IP cameras including pan-tilt-zoom cameras;
  Wireless access points;
  IPTV decoders;
  Network routers;
  Mini network switches;
  Network Intercom/Paging/Public address systems and hallway speaker amplifiers;
  Wall clocks in rooms and hallways, with time set using Network Time Protocol;
  Outdoor roof mounted radios with integrated antennas, 802.11 or 802.16 based wireless CPEs (customer premises equipment) used by wireless ISPs;
  Industrial devices (sensors, controllers, meters etc);
  Access control and Help-points (intercoms, entry cards, keyless entry, etc);
  Lighting controllers and LED Lighting fixtures;
  Stage and Theatrical devices, such as networked audio breakout and routing boxes;
  Remote Point of Sale (POS) kiosks; and
  Physical Security devices and controllers.

The devices listed above are designed to be powered via their ethernet connection as such they will be called hereafter POE powered devices.

In addition to powering devices directly using POE, it has also been discovered that it is possible to generate high voltage power at remote sites using inverters powered by high power POE connections. Once 240V or 110V power has been created it can be used locally without the risks that high voltage cables would have posed in bringing high voltage power to the same point.

Lighting is perhaps the most important example of what can be powered by high powered PoE connections. New generations of low voltage lighting are more than adequate from a luminosity and brightness perspective to provide lighting for construction sites. By replacing high voltage cabling for lighting alone, the present invention immediately provides an improvement and safety advantages over the prior art. However the benefits of the invention also accrue from the fact that the low voltage power is provided by a traditional communications network technology. By providing power over Ethernet the invention also introduces efficiencies when it is realised that in addition to distributing power via the ethernet connections and cables, the mobile station 10 can also distribute data connectivity, thereby replacing separate equipment and the duplication of cables. Indeed, by using a high powered PoE power source devices, whole lengths of duplicate ethernet cabling can be eliminated in addition to eliminating the need for high voltage power cables.

By providing a combined data and power distribution device using ethernet the present invention provides several advantages over the prior art:

Safer—low voltage power, when appropriate, is a safer alternative to high voltage power;

Flexible—star and serial configuration of connected devices allows for a flexible arrangement of devices.

More efficient—(i) less duplication when data connectivity is also required; (ii) cables can extend in any direction 100 m allowing for a large area to be serviced by the one device (31,415 m2). In some cases the high powered devices such as those 150 W per port mid spans from Phihong can extend this range to 150 m, increasing the area services to up to 70,685 m2.

Increased functionality—by turning previously "dumb" devices such as lights into "smart" devices capable of interacting by way of data communication to a central controller.

Reduced complexity—by removing existing overlayed control technologies (DSI, DALI or 0-10V).

Base Station

The first aspect of the invention is comprised of a mobile POE power station that is adapted for use in a construction zone environment. The base station of the present invention is mobile and able to be transported and located at points within a construction site. Construction sites are dusty environments with lots of particulate matter in the air. Additionally, if the roof or other protective structures are not yet fully built there can be an ingress of rain and water. Accordingly the enclosures of the present power stations are preferably rated to a minimum of IP65 which allows them to be used outside and within the harsh building zone environments.

It is important aspect that the mobile stations according to the present invention are adapted for use in a building site by the inclusion of enclosures, weatherproof ports and means for transporting the station as a whole so that no assembly is required on site. This is very important as it obviates the need for electricians and networking professionals. Castors, wheels, frames and handles all can be used to make it easy to move the stations about. Mounting brackets may also be provided for temporarily attaching the mobile stations to building sites. The term weatherproof for the purpose of this specification includes IP ratings as low as IP23 but preferably in the range IP65 to IP67.

Figure 2:
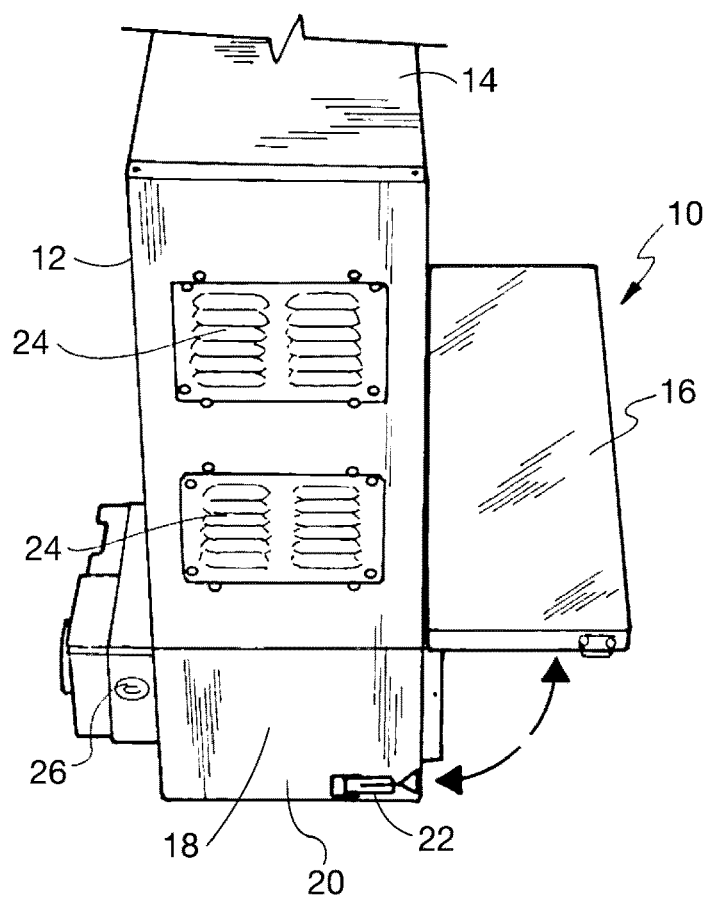
FIG. 2 is a side view of the station of FIG. 1.

Turning to FIG. 1 and FIG. 2 there is depicted a station 10 which comprises an IP65 rated enclosure 12. The enclosure is divided into two sections. A closed compartment 18 and a patch panel enclosure 20. The closed compartment contains many of the configurable elements of the system which should not be tampered with once delivered to a construction site. The closed compartment 18 is accessed by removing the top cover 14 which is secured using security screws 15. Top cover 14 also features a handle 17 for transporting the fully configured station 10 for use in a construction site. FIG. 2 shows the door 16 to the patch panel enclosure open and also shows the locking means 22 which when engaged, prevents users from altering the Ethernet cabling installed into the patch panel contained within the patch panel enclosure 20. FIG. 2 also shows vents 24 and power source 26 which comprises a plug for introducing high voltage power into the station 10.

Figure 3:
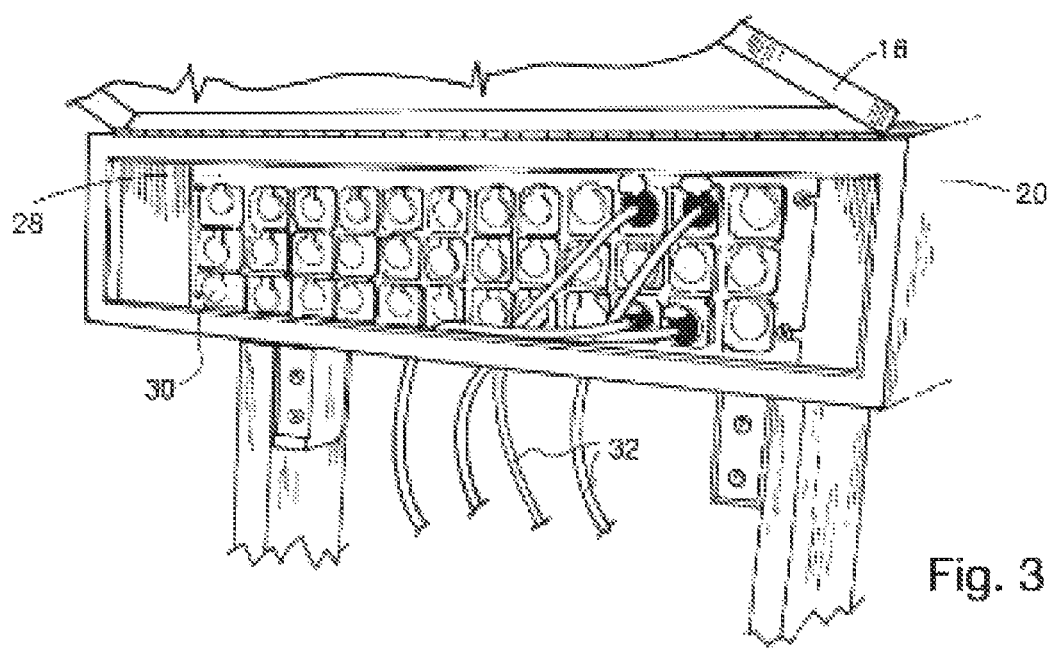
FIG. 3 is front perspective view of the patch panel of the station of FIG. 1.
Figure 4:
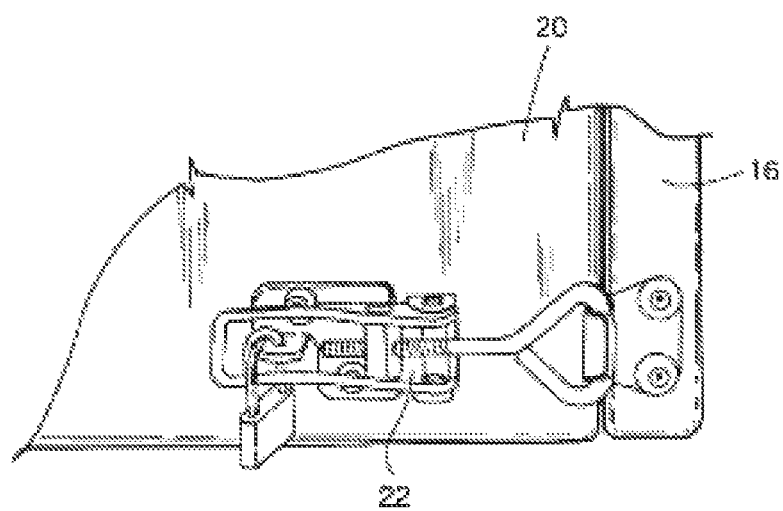
FIG. 4 is side view of the locking means of the station of FIG. 1.

FIG. 3 depicts patch panel 28 visible once patch panel door 16 is opened. Patch panel 28 contains a plurality of IP65 rated RJ45 jacks 30 for inserting IP65 rated RJ-45 plugs on the ends of Ethernet cables 32 into them. Once the Ethernet cables 32 have been inserted into the appropriate Ethernet port on the patch panel 28 the door 16 is lowered and locked using lock 22 shown in FIG. 4, thereby preventing the unauthorised removal or tampering with the Ethernet cables.

Figure 5:
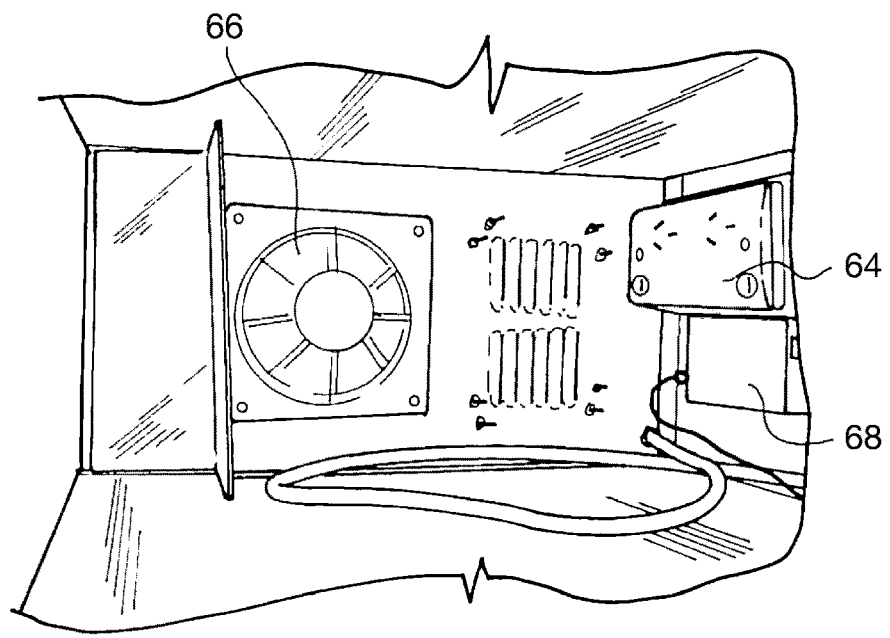
FIG. 5 is an internal view of an enclosure of the station of FIG. 1.
Figure 6:
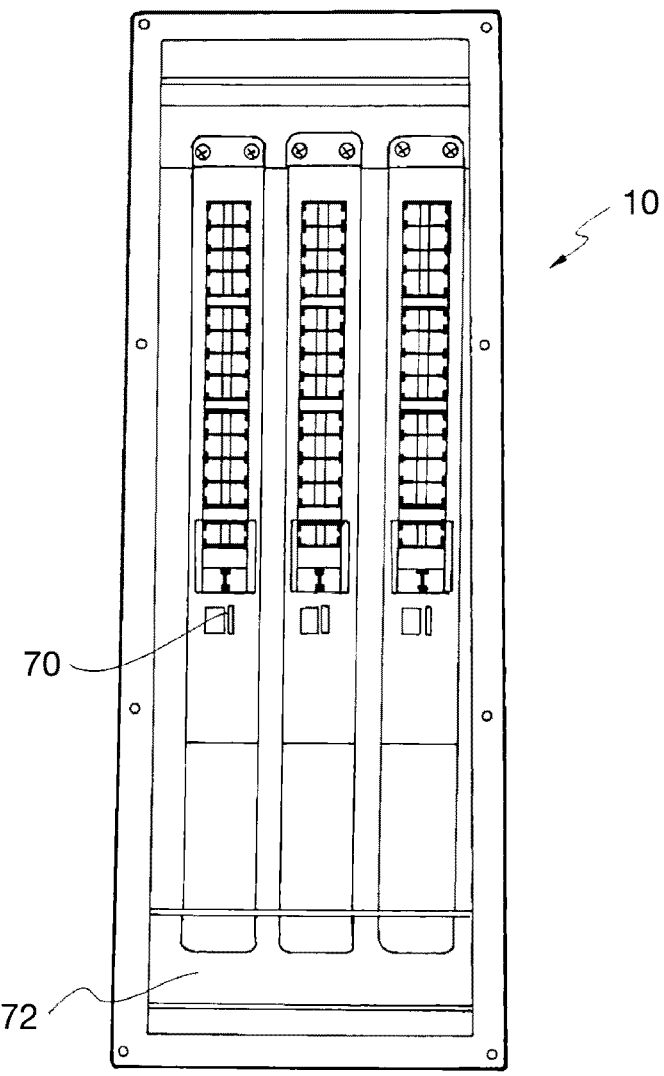
FIG. 6 is a top down view of the station from FIG. 1 with its lid removed exposing the enclosed switches.

FIG. 5 depicts the inside of the closed compartment 18 with the lid 14 removed and it having been substantially emptied of its components. It shows a power supply 64, fan 66 and low voltage power supply 68. Alternative cooling means may be incorporated including heat pumps, pettier coolers or ducted air conditioning. FIG. 6 depicts the closed compartment 18 with the lid 14 removed to show the built in POE switches 70 mounted on rack 72. Suitable switches include:

CISCO Catalyst 3560 CX switch 44 which has direct power over ethernet support (PoE plus: iEEE 802.3at) for up to 240 W of PoE budget;

UTEPO 24 port PoE Switch providing up to 30 W per connection and up to 150 m span between the switch and the connected device.

Dlink—DES-3200-28P 28-PORT 10/100 MBPS LAYER 2 Managed Poe/Poe+ Switch With 4 Gigabit Ports (2 Utp And 2 Combo Utp/Sfp).

Dlink—28-Port 10/100 Mbps Web Smart PoE Switch with 4 Gigabit Ports (2 UTP and 2 Combo UTP/SFP)

In one embodiment it is important that the switch provide an SNMP interface for controlling the power on each of the ports and further, for it to be able to register and report voltage differences across the terminals within each port. In other embodiments including a microprocessor and dedicated I/O devices this functionality can be provided by these latter components as will be described by reference to schematics for various different embodiments of station 10.

It is also a feature of the invention to provide very high powered POE enabled connections. This can be achieved by connecting a high powered midspan device (PoE injector) such as the ones manufactured by: PhiHong in its Mega PoE range (90 W) and its Ultra PoE range (60 W-80 W) to either a non-PoE switch or by turning off the power to one or more ports on a PoE switch and having the midspan or injector add the power. Up to 200 W can be provided per ethernet connection when using an EnableIT 3400R 8 Port 1600 W—48V DC Rackmount PoE Injector/Midspan. Alternatively single port 150 W POE INJ 1000—DinX Gigabit POE injector/splitter sold by Tycon Power Systems can be used to provide high powered POE connections. In particular it can inject a total 2.5 A in a voltage range of 9-80V but preferably in the range 48V to 56V. When there is a high powered connection available that can span larger distances, it is possible to run a single high powered connection to an area then split the connection 4 ways using a Tycon Power Systems a mini PoE switch which can accept high powered ethernet input and output multiple 30 W PoE connections or alternatively multiple devices can be run in series or daisy-chained to take advantage of the high power made available by these midspan injectors.

Figure 7:
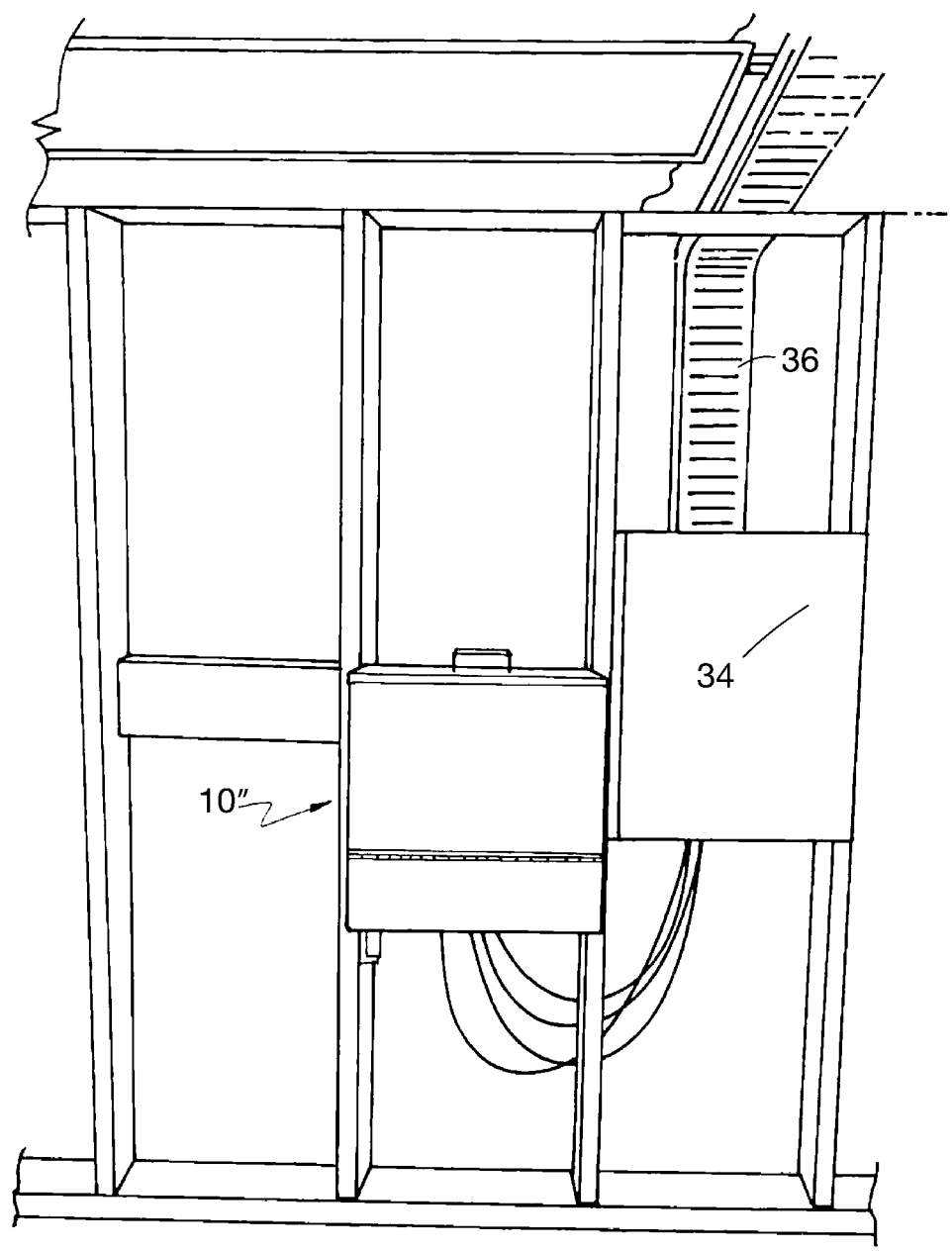
FIG. 7 is a perspective view of the station of FIG. 1 installed in proximity to a high power distribution board.

FIG. 7 depicts the station 10 having been mounted on a wall adjacent to a high voltage distribution board 34. High voltage cables are brought to the high voltage distribution board 34 via conduits and cable tray 36 which is a requirement for the treatment of high voltage cables, even in temporary installations.

Figure 8:
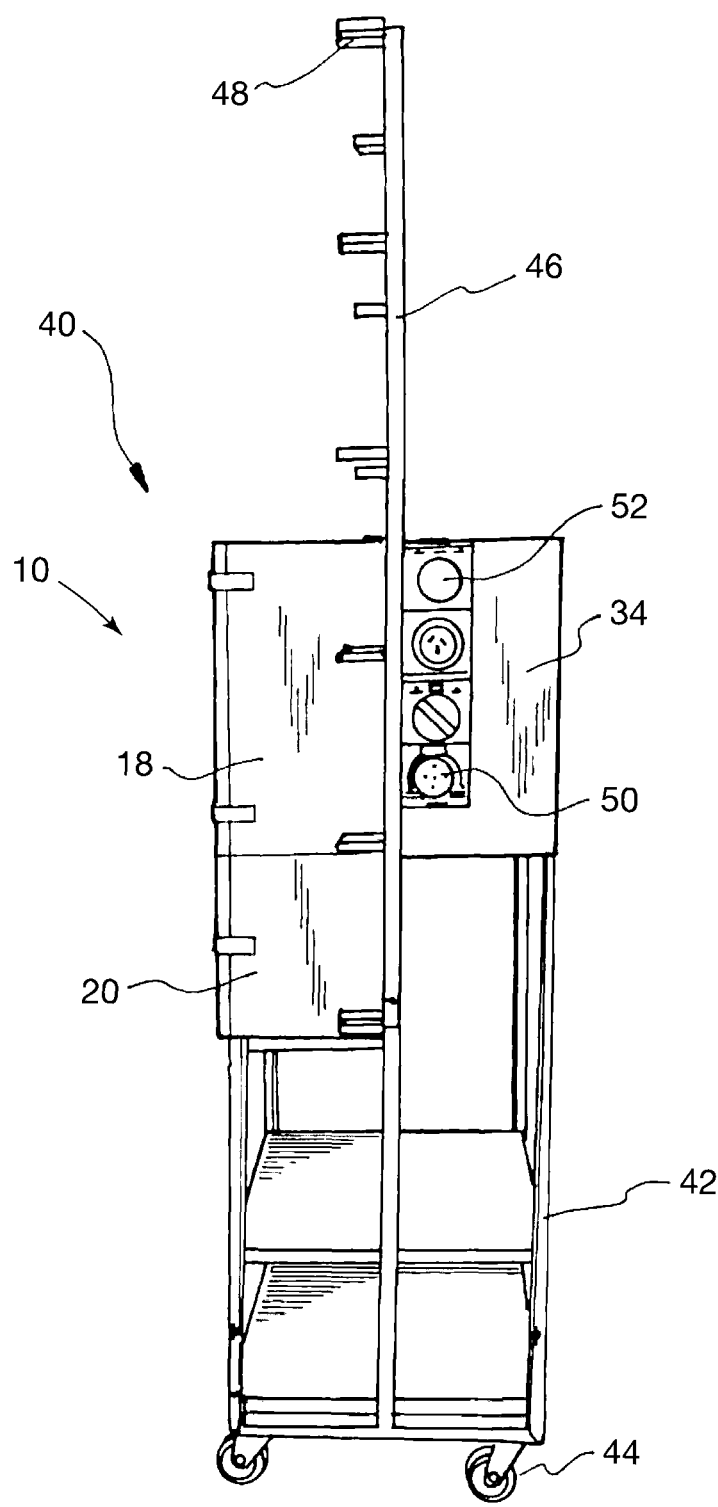
FIG. 8 is a side view of a second embodiment of the station of the first aspect of the invention.

FIG. 8 depicts an alternative embodiment of the invention. Station 40 comprises both a low voltage station 10 and a high voltage distribution board 34 combined and collocated on a mobile frame 42 which sits on casters 44 and which has cable holders 46 and 48 for holding various power cables. FIG. 8 shows the right hand side of the mobile station 10. In this figure two power outlets are depicted as being provided on the exterior of the device. These include a 5 pin three phase 415V power outlet 50 and a high amperage, heavy duty 20 A three pin outlet 52.

Figure 9:
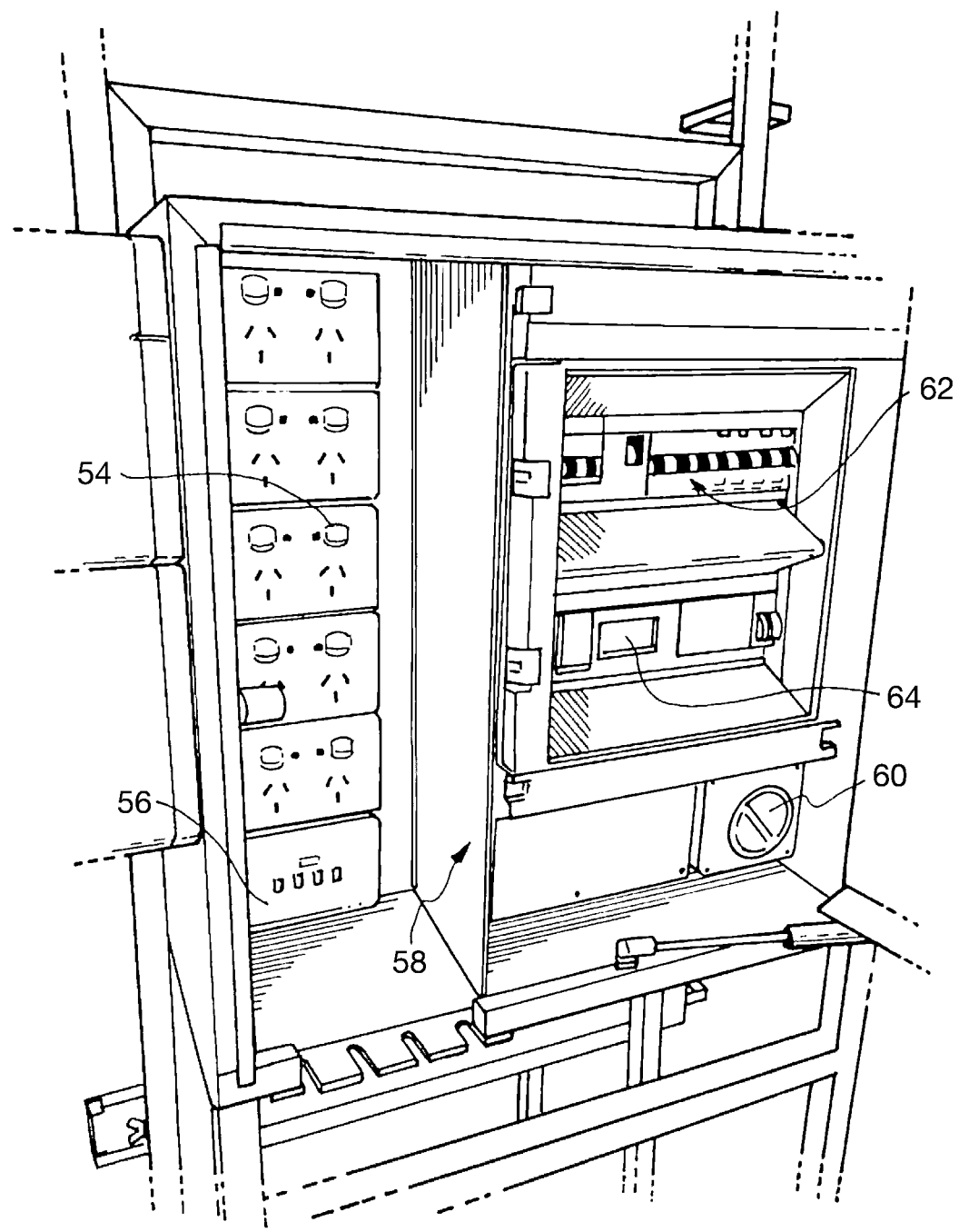
FIG. 9 is a view of the internal components of the high voltage distribution board of the station of FIG. 8.

FIG. 9 depicts the contents of the high voltage distribution board 34. Inside the high voltage distribution board 34 is a plurality of double three pin high voltage power outlets 54. In the present embodiment these take the form of 240V three pin outlets used in the Australian market however they could equally provide 110V three pin outlets or even two pin outlets depending on the applicable health and safety laws as to whether an earth must be provided. The general power outlet ports 54 are preferably provided with LED indicators to indicate by way of a light (usually red) that the port is active. There is also provided a collection of USB ports 56 for charging mobile devices and/or powering low powered devices that only require USB power. Also shown is the master controller cabinet 58. The master controller cabinet 58 may be provided in a way such that it can be locked and access provided to only certain personnel. Inside the master controller cabinet 58 there is shown the master on/off switch 60, meters 64, circuit breakers and residual current device 62. Where three phase power is sought to be delivered through outlet 50 a three phase power source must be introduced alongside the single phase 240V power source. Where only single phase power is sought to be distributed, only single phase power need be introduced. Circuit breaker and residual current device 62 are provided for the general power outlets 54 and other power outlets of the high voltage distribution board 34 and which act to protect workers should they damage any of the temporary high voltage lines. In an alternate embodiment miniature circuit breakers such as Smissline miniature circuit breakers can be installed on a power distribution bus providing the ability to hot swap socket mounted components such as circuit breakers and/or residual current device 62. The mobile station 40 also has contained within the master controller cabinet 58 meters and current sensors 64 which include an LCD display for monitoring the energy consumed by the device and the devices connected to it. In connection with the meter 64 is a webserver that logs and stores the data generated by the meter 64. In the present embodiment the webserver is a 12-28 VDC ethernet/3G/4G/USB enabled device provided by Carlo Gavazzi (RS485). In the present embodiment this webserver is accessed via a browser interface via the on board 3G/4G. In alternate embodiments it can be connected via an ethernet connection from the low voltage power over Ethernet station 10.

Reference is now made to FIGS. 10 to 14 which depict various embodiments of the station 10 of the present invention. The embodiments differ in levels of complexity and degree of control of the connected devices.

Figure 10:
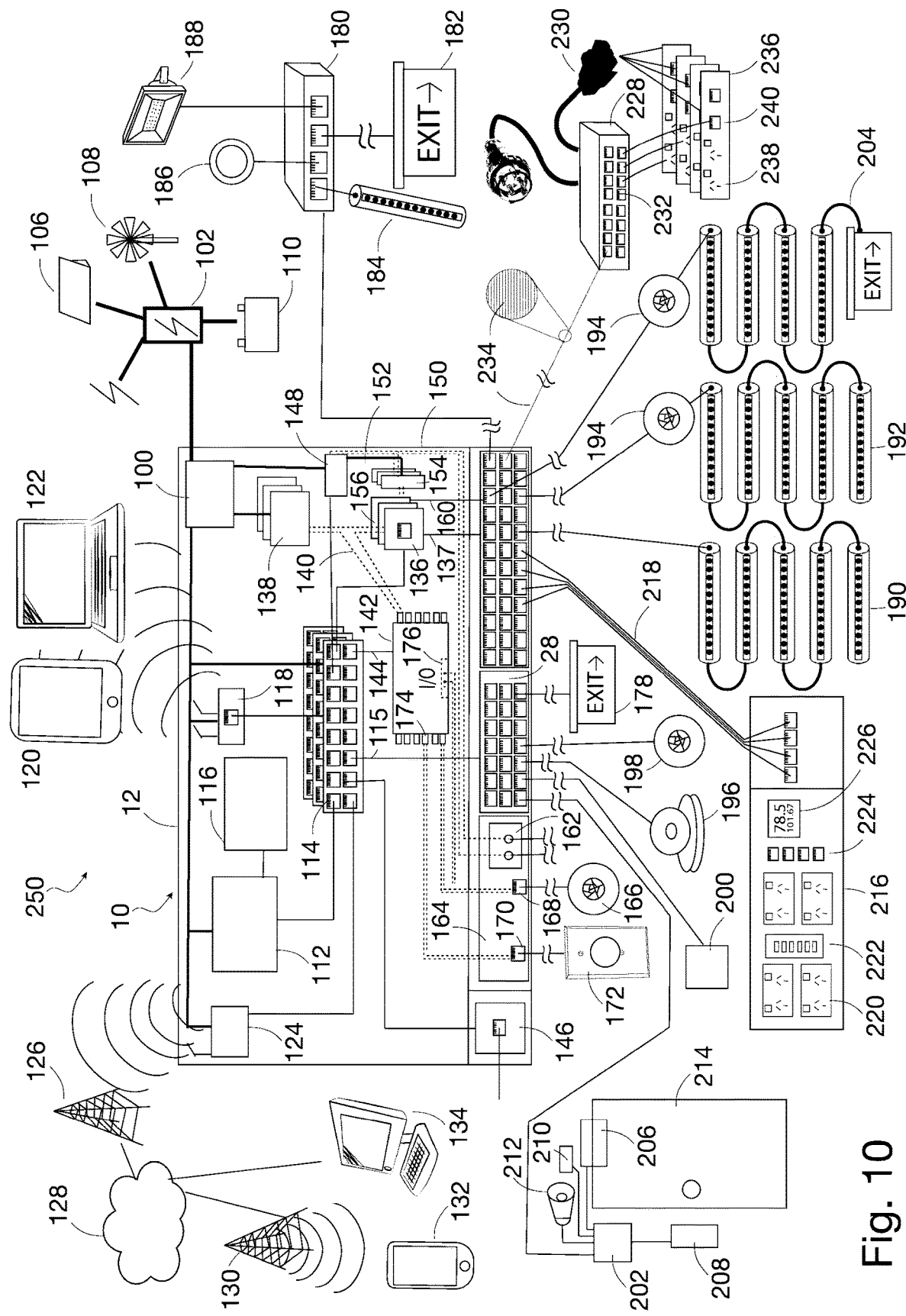
FIG. 10 is a schematic of a first embodiment of the system incorporating a station of the first aspect of the invention, according to a second aspect of the invention.

FIG. 10 depicts the most complex station 10 contained in an IP65 rated enclosure 12 which is capable of driving and controlling many different devices using POE connections made available through patch panel 28. The components of station 10 from FIG. 10 include the following:

High voltage power supply 100 which derives power from a power source 102 which in turn is connected to a variety of sources of power including grid/utility power 104, solar cells/inverters 106, wind/turbine power 108 or battery power 110. Power source 102 employs technology to determine which of the sources of power are available and which to feed to power supply 100 in the station 10.

Microprocessor/PC 112 connected to power supply 100. In the present embodiment this comprises an INTEL NUC portable PC. In other alternate embodiments it may comprise an Arduino PC or a Rasberry PI PC or it may in fact be a dedicated, preprogrammed microprocessor. The NUC PC has an i3 or i5 Intel processor, on board graphics and associated HDMI port, a built in ethernet port for networking, wifi, solid state drive, USB ports for keyboards and other inputs such as touchscreen interfaces, infra red sensors, audio ports and is capable of running Windows 10.

IP65 rated Touchscreen 116 which is mounted on the outside of the station 10 or which is located inside an accessible panel of enclosure 12 (not shown). Touchscreen 116 is connected to NUC 112 by USB connection or USB and HDMI connection.

POE switch 114 which in the present embodiment is a UTEPO 24 port PoE Switch providing up to 30 W per connection via Ethernet connections 115. Multiple switches may be employed if necessary to provide the required number of POE ports.

Wifi router/access point 118 for providing remote users tablets 120 and laptops 122 access to the controlling interface provided by NUC 112.

3G/4G telecommunications module 124 which provides network connectivity to station 10 using telecommunications network 126 and internet 128. This allows for users of PC's 134 connected to Internet 128 to access the control interface provided by NUC 112. It also allows the NUC 112 to communicate with a SMS gateway 130 for sending text message alerts to mobile phones 132.

High Power Mid Spans or Injectors 136—high power POE injectors 136 such as 150 W POE INJ 1000—DinX Gigabit POE injector/splitter sold by Tycon Power Systems receive DC power derived from DC power supplies 138. One of the DC power supply wire 140 is routed through I/O device 142. POE injectors 136 also receive Ethernet connections from POE switch 114. In this case those ports accessed on the POE switch 114 have the power component disabled via the switch 114's control system by the NUC 112. The output of the high power injectors 136 is provided to patch panel 28 via Ethernet connection 137. Multiple POE injectors 136 can be utilised as required.

I/O Device 142 such as AXIS A9188 Network I/O Relay Module made by Axis Communications AB can power high power POE injector 136 off and on by opening and closing the DC power supply circuit incorporating DC supply wire 140. This is done under the control of the NUC 112 which controls the I/O device 142 via its Ethernet connection 144 to POE switch 114 and through to NUC 112.

Network input 146—for connecting an Ethernet cable carrying an external network which may be derived from another master station 10 or in some cases the builders own network infrastructure. Network Input 146 is connected to POE switch 114.

Lighting Controller 148 connected to power supply 100. Lighting controller 148 outputs a conventional DALI bus containing two low voltage DALI control wires 150 and a high voltage mains rated cable 152. Connected to the DALI bus are a number of DC Strings LED driver modules 154 which take high voltage power, transforms it into DC power for powering LED strips and overlays the DALI control signal over the DC power, the combined power and DALI signal is then fed into POE injector 156 creating a high powered DALI/POE connection and output to patch panel via Ethernet connection 160. DALI signal wires 150 are also connected to DALI I/O connections 162 from which an external low voltage DALI bus can be extended.

Patch panel 28 has a large plurality of IP65 rated RJ45 jacks.

- Those connected via Ethernet connections 115 directly to the switch have standards compliant POE according to the IEEE802.3at standard. They have sufficient power to power many standalone POE devices and which require data connectivity over the TCP/IP layer. These will be called "low power POE" connections hereafter.
- Those connected by Ethernet connection 137 to POE injectors 136 which are in turn connected to DC power supply 138 and I/O device 142 can deliver up to 150 W per connection using non-standards based technologies. These connections have data/TCP/IP component to them. Hereafter these shall be known as "high power POE" connections.
- Those connected by Ethernet connections 160—these have a DALI signal overlayed on top of the up to 150 W of DC power derived from the DC strings LED driver 154. Hereafter these are known as "high power DALI POE" connections.
- Those on input panel 164. These are RJ-45 sockets that are connected back to the inputs connections of the I/O device 142. Devices connected to these Ethernet ports on input panel 164 have their signals received into the Station 10 and delivered to the I/O device 164 which monitors the inputs and sends notification of signals received to the NUC 112 for further processing. For example switch 172 connected via Ethernet port 170 has when depressed completes a circuit which is registered at inputs 174. The registered signals cause I/O device to communicate with NUC 112 which in turn sends a signal to I/O device 142 to open or close the circuit involving DC power wire 140, thereby turning a device connected to the corresponding Ethernet port on the patch panel 28 on or off depending on how the system is configured. The input panel of ports 164 also provides DC power to connected devices via DC outputs 176 on the I/O device which are routed into the RJ-45 jack. For example DC power is provided to PIR (passive infrared) motion sensor 166 via RJ-45 port 168 which is derived from DC power source 176 on I/O device 142 and which also connects the motion sensor to the input section of the I/O device 142.

There are also many devices that are adapted to be powered and controlled by station 10. What follows is a brief description of the devices which will be supplemented when each of the devices is described in further detail.

Figure 15:
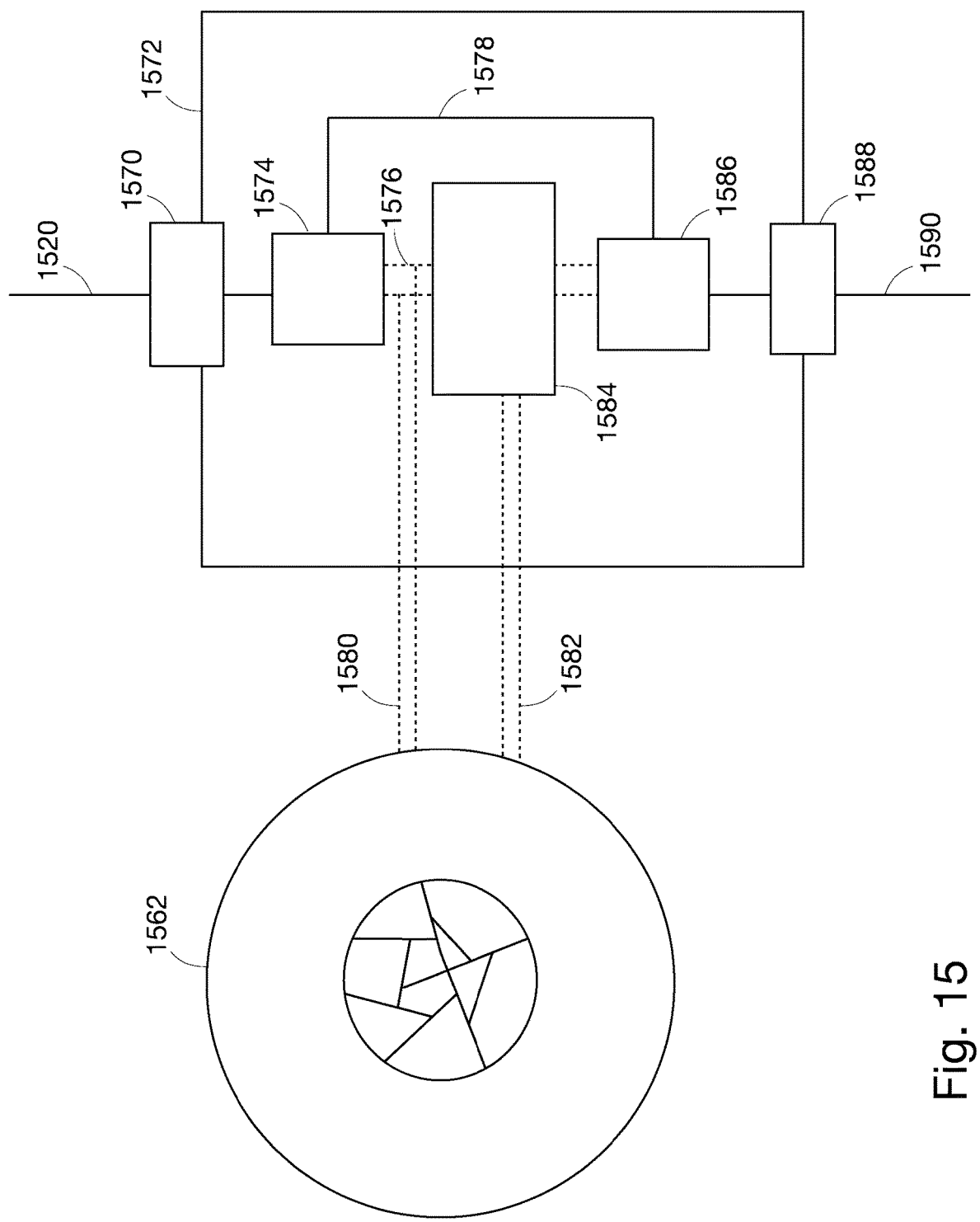
FIG. 15 is a schematic of a PIR component of systems of the second aspect of the invention.

- Single LED lights 178—these can be powered via low powered POE connections or high powered POE connections. Because their power requirements are low they are preferably connected to the low power POE connection in patch panel 28. Alternatively, by utilising a remote splitter/POE switch 180 (comprising a Tycon Power 4 way POE splitter described earlier) individual or single LED lights can be efficiently powered by a high power POE connection. Such LED light fixtures can come in a range of form factors including emergency exit signs 182, batten 184, downright 186 and floodlight 188. Each light can be made in a sustained version or non-sustained version.
- Strings of LED lights 190—these are connected to high power POE connections as each light consumes around 20 W of power which for five lights sits within the 150 W power budget made available through high power POE connections utilising the Tycon power POE injector/splitter previously described. More lights can be added until the power budget is exhausted. Six 20 W lights would fit comfortably within the budget. Strings of LED lights with self activating sensor 192 contain the same string of five LED lights but with a PIR sensor 194 wired into the device upstream of the lights. When motion is detected current flows through to the five lights. When motion is not detected the power to the lights is cut. The mechanism by which this is achieved is depicted in FIG. 15 It depicts a high powered POE connection 1520 being passed to RJ45 jack 1570 which brings the Ethernet connection into enclosure 1572. The Ethernet connection is then passed to POE splitter 1574 which splits the incoming connection into DC wires 1576 which carry the high power DC current and Ethernet connection 1578. The DC wires 1576 are hard wired to the power inputs of PIR 1562 (EBDSPIR-PRM-VFC-LV from MyStart Pty Ltd) via power wires 1580 which power the PIR. When the PIR 1562 senses motion, it outputs a signal along sensor wires 1582 which are then connected to relay 1584 in enclosure 572. When the relay is provided an active signal it opens a circuit between the high power DC wires 1576 and the DC input wires to POE injector 1586. POE injector 1586 takes the DC power supplied and the Ethernet connection 578 and combines them for output via RJ45 jack 1588 and through to LED light fixtures on Ethernet connection 1590.
- Strings of DALI controlled LED lights 204 which are each individually addressable by the lighting controller 148. DALI strings 204 can optionally have in line self activating PIR sensor 194 as in the case of the LED string 192.
- IP cameras 196 which can be integrated into a security control system programmed into the NUC 112.
- Standalone IP sensors such as IP PIR sensor 198.
- Environment IP sensor 200 which are commercially available sensors for monitoring a plethora of environmental conditions such as temperature, humidity, light levels, $CO_2$ levels, CO levels, gas levels etc.

Access control system 202 which in turn is connected to the door contact/strike, a RFID card reader or switch to exit 208, a REX module 210 and a siren/speaker 212 associated with a secured door 214.

Charging Station 216 powered by 4 high power POE connections 218. Charging station converts the high power POE power made available over the Ethernet connections 218 and converts the power into 500 W of high voltage power which is output over general power points 220. In addition charging station 216 also features USB charging points 222 and data ports via Ethernet 224. Optionally the charging station 216 also has electricity meter and consumption display 226. Charging station is enclosed in an IP65 rated weatherproof enclosure suitable for outdoor use and use within construction sites.

240V (or 110V) conversion module 228—this receives 16 high power POE connections 234 to provide DC power for conversion into up to 2000 W of high voltage power and 16 Ethernet connections. The 240V power is output via a soft wiring connector 230 such as those manufactured by CMS Electracom. The 240V conversion module 228 strips out the data connection made available over the 16 high power POE connections and outputs those via RJ-45 ports 232. Softwiring connector 230 and data connections output via ports 232 are in turn connected to desktop modules which provide 240V power points 238 and data connections (Ethernet ports) 240 for installation into walls, desks and workstations where such connections are desired. 240V conversion module 228 has applications outside of the temporary/construction site market and would be of particular benefit to reduce 240V wiring in permanent fit outs.

Having regard to FIG. 10 and the components of the station 10 and the components of the wider system 250 which incorporates the connected devices it is noted that the station 10 can power on and off all connected LED lights in a number of different ways including (i) by powering or depowering ethernet ports on switch 114 which have LED lights 178 connected, (ii) by powering or depowering POE injectors 136 to which strings of lights 192 or groups of single LED lights off a miniswitch 180 are connected, or (iii) by directly addressing individual DALI controllable lights connected via high powered DALI POE connections via the lighting controller 148. All of these controls are exercised by the NUC 112 running software that also monitors inputs 164 to which the controls are linked. In addition to direct controls, light can be autonomously controlled by way of PIR's 194 which do not report back to the station 10 but rather simply open the power circuit provided by the high power POE connection by way of a relay as shown in FIG. 15.

Other advantages of including the wider range of connected devices with an intelligent control system operating as a hosted application on the NUC 112 is that the various sensors can be used to perform operations upon defined criteria. For example when the panic button or switch 172 is activated. The signal passes through the I/O device 142 through to NUC 112 which in turn, communicates through to a SMS gateway 130 which delivers a text message to a mobile phone 132 indicating that the panic button 172 has been depressed and also firing a siren including siren 212 (or one directly connected to station 10 via a low power POE connection). Similar functionality can be provided upon the after hours detection of motion in certain areas or when the access door system 202 is utilised to open a door 214. In other cases, the temperature or colour of the light emanating from connected light fittings might be changed to reflect the ambient temperature detected by environmental sensors 200. Lights might be made to flash (via modulating the power signal using the NUC controls or via a DALI command sent to DALI controlled lights) when dangerous levels of gasses including $CO_2$ are detected.

Figure 18:
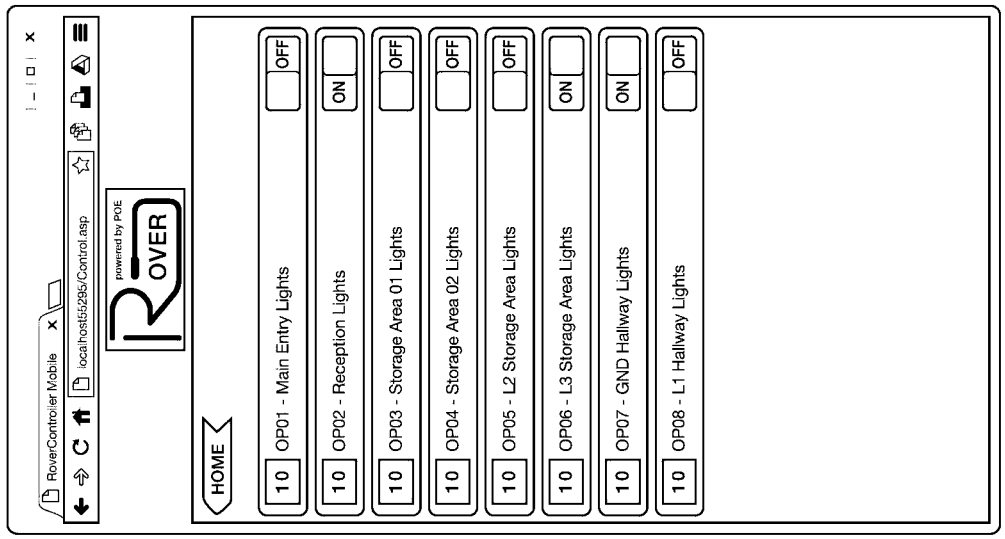
FIG. 18 is a still further screenshot of a user interface of the software controlling various aspects of the system according to the second aspect of the invention.
Figure 17:
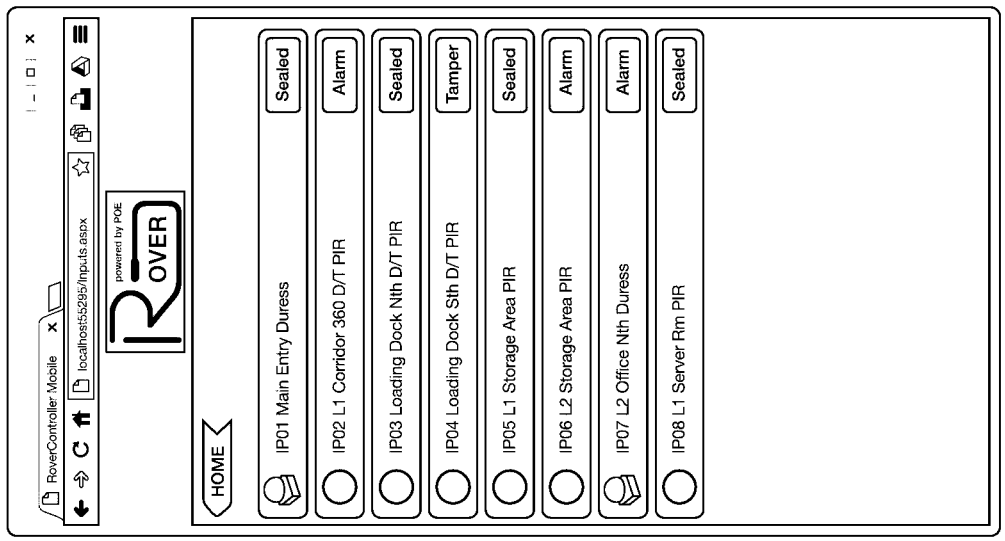
FIG. 17 is a further screenshot of a user interface of the software controlling various aspects of the system according to the second aspect of the invention.
Figure 16:
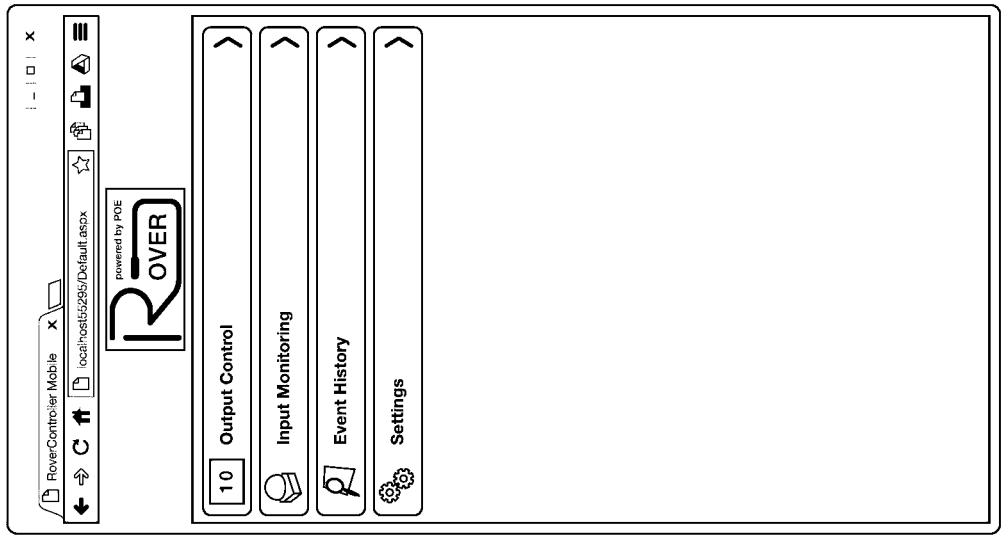
FIG. 16 is a screenshot of a user interface of the software controlling various aspects of the system according to the second aspect of the invention.
Figure 19:
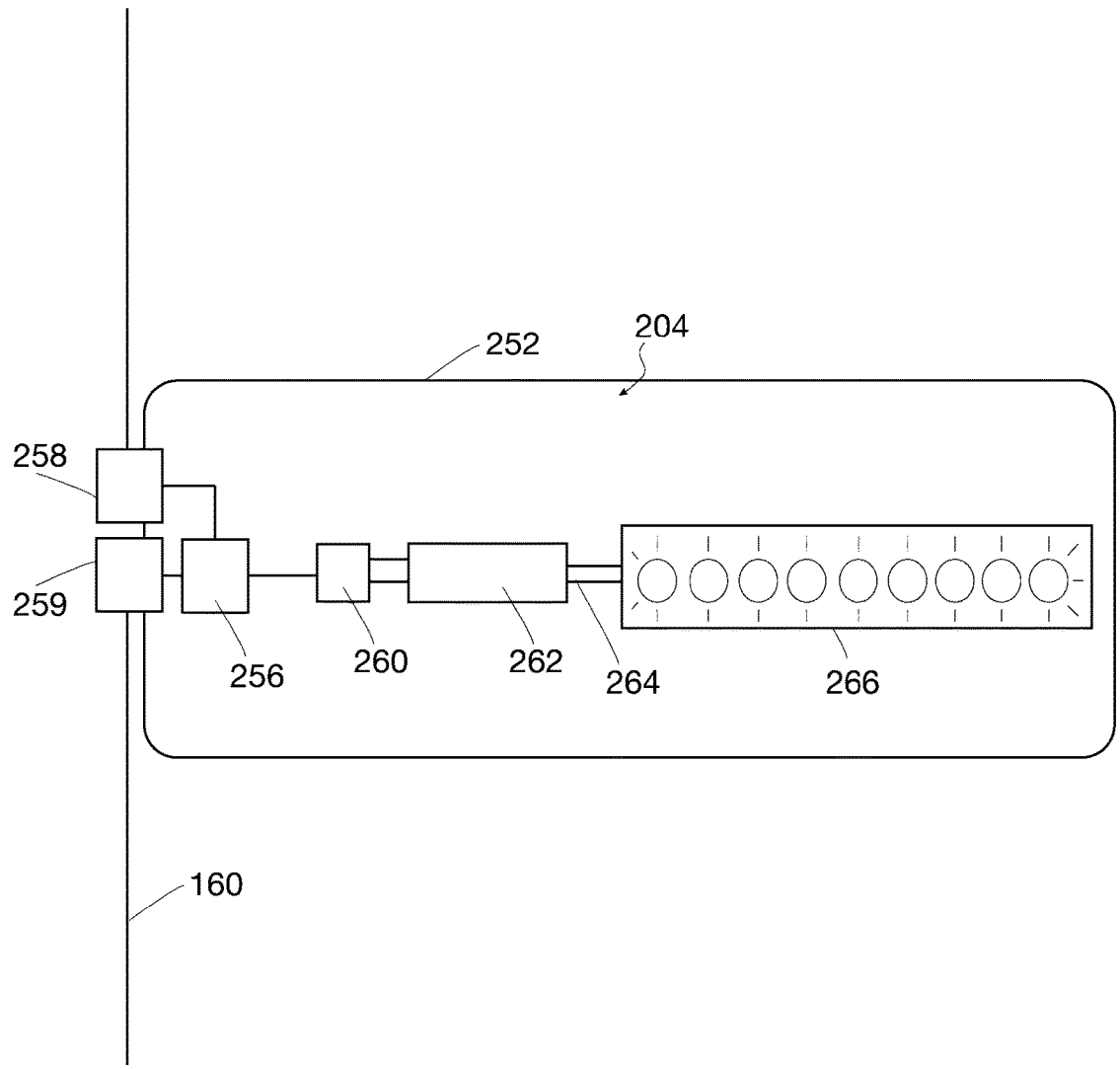
FIG. 19 is a schematic of a DALI enabled lighting component of a system of the second aspect of the invention.

FIGS. 16 through 18 depict screens of the control software which is hosted locally on the NUC 112 and which is available over touchscreen 116 or via connected devices 120, 122 or 134. Software in one embodiment comprises a webserver application which can be accessed by authorised users over the Internet. FIG. 16 depicts the software providing control over outputs, input monitoring, event history and settings. FIG. 17 is a depiction of the input monitoring—where the software allows the user to activate or deactivate monitored sensors and where the results of the monitoring are provided on the event history screen (not shown). FIG. 18 depicts the output screen where individual lights and strings of lights can be turned on or off using the toggles provided. Live video will be able to be viewed from any RSTP compliant feed through the software and user interface provided by the software running on NUC 112. When personnel in the facility in which the system is deployed are issued RFID or are set up in the system using biometric information such as fingerprints, the relevant sensors in the building will also record the movement of said personnel and log them for later retrieval by users of the system.

Importantly the station 10 can be configured such that any POE devices utilising TCP/IP for communication can have static IP addresses such that the builder does not need to configure the system upon deployment. Alternatively for more complex deployments DCHP can be used to serve out IP addresses via router 118 or via a builder's router upstream of builder's connection 146.

Multiple stations 10 can be linked together as a master/slave. The station 10 can be programmed such that when an incoming network connection is detected from another station 10 via inputs 146, the NUC 112 disables itself and all control falls to the NUC 112 in the upstream station 10. Multiple stations 10 could also be connected via Ethernet sent over power line technology. That is, a data only Ethernet output from patch panel 28 could be fed into a Ethernet over power module located on high voltage power circuit. Provided that it is the same circuit a corresponding Ethernet over power module can bring the Ethernet signal back out of the power circuit at a remote location for reintroduction at a remote station 10 via inputs 146 as a slave station.

Other Embodiments of Station 10

Figure 12:
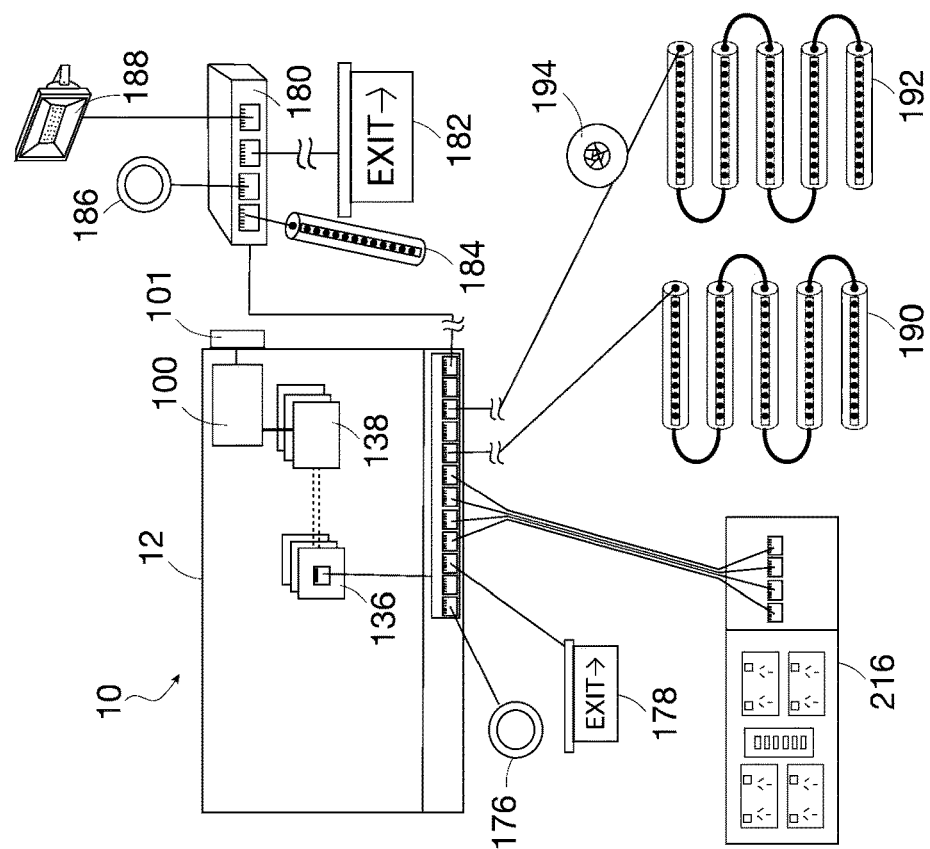
FIG. 12 is a schematic of a third embodiment of the system incorporating a station of the first aspect of the invention, according to a second aspect of the invention.
Figure 11:
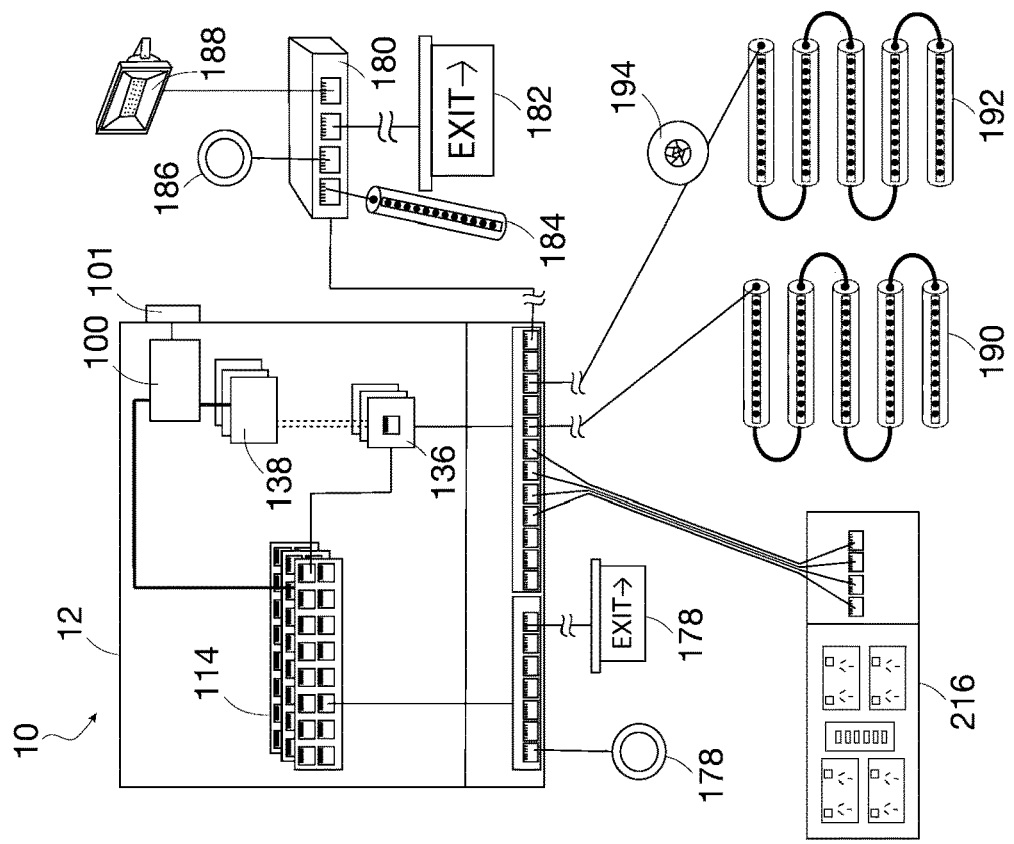
FIG. 11 is a schematic of a second embodiment of the system incorporating a station of the first aspect of the invention, according to a second aspect of the invention.

FIGS. 11 to 14 depict alternate embodiments of station 10. Turning firstly to FIG. 11 this station 10 is a less complex version of station 10 from FIG. 10. Whilst it has a POE switch 114 there is no PC or NUC 112 to perform control functions in real time. However as it has a POE switch 144 low power POE connections are available to drive POE powered devices including LED lights. It also has the high power POE injectors 136 enabling the driving of strings of LED lights 190 and 192 which incorporated the in line PIR sensors 194. The high power POE connections can also drive miniswitch 180 and its connected LED lamps 182, 184, 186 and 188. Control of the lights, other than the automatic motion sensing provided by PIR 194 is limited to turning the entire station 10 off by an external switch 101. FIG. 12 depicts a similar station 10 to the one in FIG. 11. The station 10 of FIG. 11 does not have a POE switch 44 and thus the only connections available are those supplied by the high power POE injector 136. Lower powered injectors or mid spans may be used to provide connections of less than 150 W. Both the systems in FIG. 11 and FIG. 12 lack the integration with environmental and other sensors and also lacks the ability to automatically perform functions based on the sensed inputs.

Figures 13, 14:
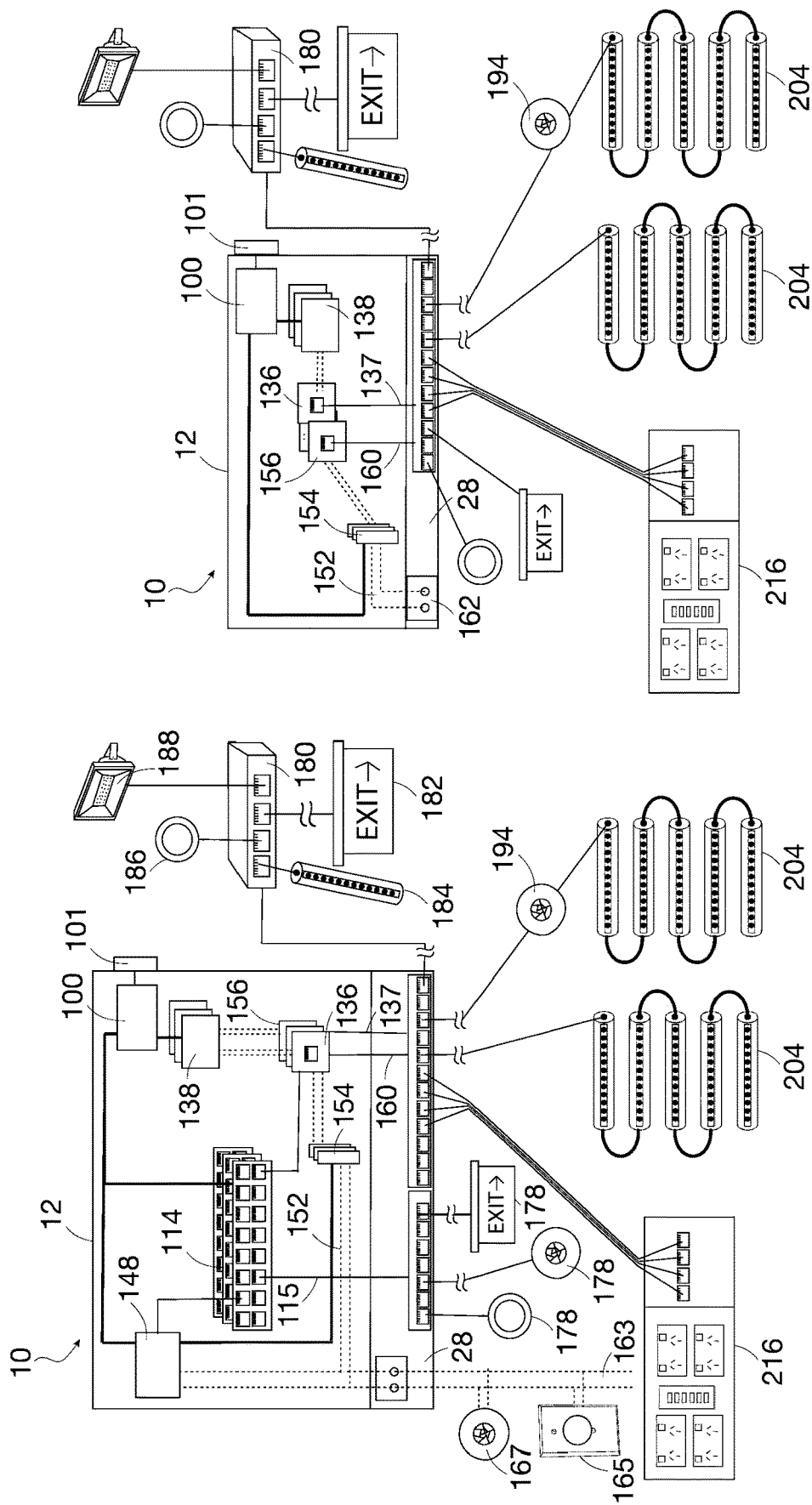
FIG. 13 is a schematic of a fourth embodiment of the system incorporating a station of the first aspect of the invention, according to a second aspect of the invention.
FIG. 14 is a schematic of a fifth embodiment of the system incorporating a station of the first aspect of the invention, according to a second aspect of the invention.

FIGS. 13 and 14 depict schematic diagrams of stations 10 which drive DALI enabled LED lighting fixtures and related equipment. They are particularly suited for temporary installations where there may not be a DALI lighting control system in place such as in the case of station 10 from FIG. 13 which incorporates a built in Lighting Controller 148 (such as LICS Lighting Controller manufactured by Vossloh-Schwabe Deutschland GmbH or the Diginet DALI Ethernet controller DGLMIFE02). Alternatively a temporary lighting control system may be in place in which case station 10 from FIG. 14 can be utilised which receives the DALI signal via low voltage inputs 162.

Lighting stations 10 both contain a plurality of LED drivers 154 which are connected to 5 wire DALI bus 152 LED drivers. The LED driver 124, such as the TALEX driver LCY 48V 150 W DC-STR DIM IP manufactured by Tridonics, transforms the high voltage power into 150 W, 48V low voltage power and overlays the DALI control signal over the low voltage power in its two wire DC output.

The DALI bus 152 is output by the lighting controller 148 in lighting station 10 from FIG. 13 or it is formed by combining the DALI signal wires inputs 162 with high voltage power from power supply 100 in station 10 of FIG. 14. LED drivers 154 receive the DALI signal from the bus 115 and overlay it onto up to 150 W of DC power which is then passed to POE injector 156. The high power injectors 156 then output the power for the LED strips to be driven and the control signal over all four pairs of wire in an Ethernet connection 160 which is then made available via patch panel 28 for connecting strings of 20 W LED light fixtures 204 or for supplying power to a remote POE splitter 180 which divides the high power input into 4 separate channels suitable for single LED lights 182, 184, 186 and 188. Station 10 of FIG. 14 has an external DALI bus 163 for connecting DALI switches 165 and DALI sensors 167. The DALI bus 163 is derived from lighting controller 148 powered by power source 100.

A schematic of a DALI LED light fixture 204 is provided at it is noted that they are directly powered from the Ethernet connection 160 which has the DC power and DALI signal overlayed on top of it. Enclosure 252 is a weatherproof IP65 rated enclosures for outdoor or temporary use. RJ45 jack 254 is in this preferable embodiment, connected to an Ethernet T splitter 256 which takes the Ethernet connection and splits it into two Ethernet connections, one of which is redirected back to RJ-45 jack 258 for daisychaining additional Ethernet connected devices. The other Ethernet connection from T splitter 256 is then fed into a compatible POE splitter 260 which in the preferred embodiment is the 150 W POE INJ 1000—DinX Gigabit POE injector/splitter sold by Tycon Power Systems. This POE splitter 260 splits off the combined DC current and DALI signals from the Ethernet connection. The combined DC current and DALI signals are then fed into LED driver 262 such as Tridonic's LMI 48V 350-700 mA 20-42V FO Slim driver. LED driver 262 receives both the DAL, signals and the power with which to power the constant current LED strip or strips 266 which it outputs via DC output 264. DALI Ethernet LED lights can also be provided in sustained versions which incorporate a battery backup and an inverter PCB for powering the LED strips when the mains power is disconnected. This makes them useful for emergency exit lights as well as regular sustained emergency lighting.

Stations 10 in both FIGS. 13 and 14 are also adapted to power strings of LED light fixtures or individual LED lights without any overlayed DALI signal. In both cases, power source 100 is used to drive DC power supplies 138 which in turn feed 48V DC power to high power POE injectors or midspans 136 which inject up to 150 W of DC power into Ethernet connections 137 which are then output via patch panel 28. In the case of Station 10 of FIG. 13 the DC power is combined in injector 136 with an Ethernet connection 139 derived from POE switch 114 which is in turn connected to lighting controller 148. This connection allows lighting controller 148 to separately address connected devices via TCP/IP protocol including LED drivers, sensors, IP cameras, access control systems, switches, scanners and similar devices. This allows for further integration of DALI components within a wider array of connected devices. Station 10 also provides a number of standards compliant POE connections 115 derived directly from the POE switch 114. These standards compliant connections provide up to 30 W of power per connection and so are suitable for single LED lights 552 and a wide variety of POE powered devices.

LED Drivers and Lamps

The mobile power and lighting distribution devices of the present invention are preferably used with LED lights for providing temporary lighting solutions. However, it is not limited to powering LED lights. As the station according to any of the first four embodiments of the first aspect of the invention can provide high powered (up to 200 W) per PoE connection, the use of 240V conversion modules 228 means that even devices that operate on 240V AC could be made to operate over Ethernet powered connections. Certainly halogen, fluorescent and other lighting types could be made to operate with the mobile stations of the present invention.

However, due to the efficiencies that can be achieved by powering LED lights, it is preferably intended that the stations operate with respect to various different types of LED lights.

LED lights are invariably driven by LED drivers. An LED driver is an electrical device which regulates the power to an LED or a string (or strings) of LEDs. An LED driver responds to the changing needs of the LED, or LED circuit, by providing a constant quantity of power to the LED as its electrical properties change with temperature. An LED driver is a self-contained power supply which has outputs that are matched to the electrical characteristics of the LED or LEDs. LED drivers may offer dimming by means of pulse width modulation circuits and may have more than one channel for separate control of different LEDs or LED arrays. The power level of the LED is maintained constant by the LED driver as the electrical properties change throughout the temperature increases and decreases seen by the LED or LEDs. The conventional view is that without the proper driver, the LED may become too hot and unstable, therefore causing poor performance or failure.

LED drivers come in two major types. A constant current LED driver varies the voltage across an electronic circuit allowing the device to maintain a constant electric current. This thus ensures that, no matter the variation in voltage, the current delivered to LEDs does not change. In contrast to constant current power supplies, constant voltage LED drivers have a fixed voltage of 48 VDC or 24 VDC supplied to the circuit. The LED's or LED strips utilised will dictate whether a constant voltage or a constant current driver is required.

As mentioned above, LED lamps incorporating LED drivers offer the ability to control the output of the LED from intensity to colour. Conventionally this has been carried out by expensive and complicated control systems that operate on the 0-10V, DALI, DSI and other protocols that were developed for incandescent and fluorescent lighting. More recently with the advent of POE powered LED lamps, control of the LED's in the lamp can be controlled via IP over ethernet enabled LED drivers. The problem with such lamps and associated drivers is that they are ill suited for the building industry and outdoor environments. Componentry such as the POE LED driver adds costs and reduces the reliability of a bank of lamps driven by them. Many of the features provided by LED lights driven by such drivers are often not required. For instance colour changing is not a requirement for temporary LED lighting in construction sites.

Accordingly it is an aim of the present invention to provide POE powered LED lights that are driverless in the sense that they are not controlled by a component of the lamp or a component which is attached to the lamp but which is controlled or operated directly by the station 10 of the present invention. Both constant current and constant voltage embodiments of the LED lamps of the present invention are provided herein.

Despite conventional considerations teaching away from driverless implementations for powering LED lamps, it has been found that the LED lifespan and efficiencies are not detrimentally affected by dispensing with the proprietary or specific LED drivers recommended for any given LED strip or LED On a most general level the LED driver is dispensed in favour of a high quality POE splitter which isolates the power necessary to drive the LED's directly in the case of constant voltage LED's or with a DC-DC constant current step down power convertor for powering constant current LED's. Note that in the latter case, the convertor does not provide any ability for controlling or remote controlling the output of the LED lamps.

Thus in the case of the lamps of the present invention, there is no assigning of IP addresses or communicating with the lamps via IP protocol which is otherwise available when powering the lamp via POE. In such a case full control emanates from the station of the present invention.

The majority of the LED lamps described herein are weatherproof. They can be used outdoors and even hosed down with water and water and dust and other particular matter will not ingress the lamp fixture, damaging the internal components. Ratings of between IP56 and IP68 are generally sufficient for this purpose. The casings are also impact resistant to a rating of IK10. Weatherproof and impact resistant casings are commercially available and include grommets, gaskets and other means of securing casing an protecting the components from impacts.

Referring to FIGS. 20 to 23 there are depicted several versions of driverless, constant voltage LED lights for use with a mobile station of the present invention. Broadly they can be divided into two categories, emergency lights (both maintained and sustained) and non-emergency lights.

Figure 20:
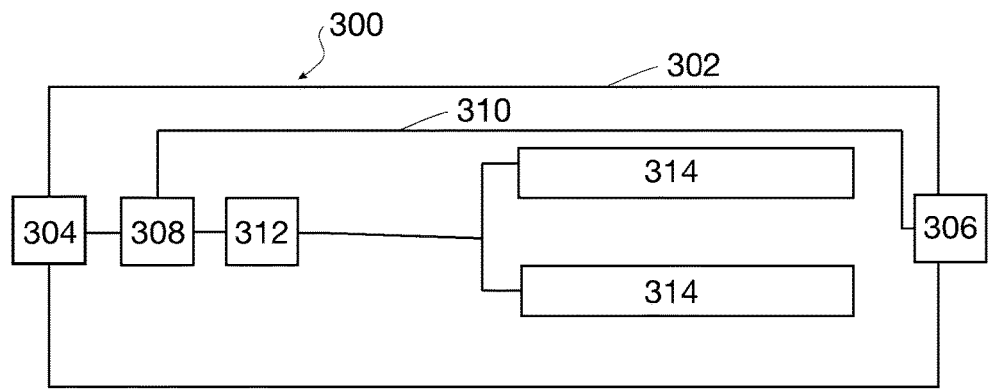
FIG. 20 is a schematic of a non-maintained Ethernet POE lighting fixture component of a system of the second aspect of the invention.

Turning to FIG. 20 there is depicted in schematic form a 20 W daisychainable non-maintained Ethernet LED light fixture 300 according to the present invention. The non-maintained Ethernet LED light fixture 300 is housed in an IP67 weatherproof enclosure 302 so that the light fixture can be used outdoors and within the harsh environment of a building site. Enclosure 302 has IP67 rated RJ45 plug 304 for receiving a powering Ethernet connection and a second RJ45 plug 306 for connecting the next light fitting in series. In between the two RJ-45 plugs is an Ethernet T adaptor 308 and a span of Ethernet cable 310. The second Ethernet connection coming out of T adaptor 308 is passed to POE splitter 312 which strips out the DC current over a pair of low voltage wires and passes the power to LED strips. In an alternate embodiment (not shown) T adaptor and POE splitter 308 and 312 are replaced with an RJ45 junction box. The junction box receives two RJ-45 plugs and connects them, instead of a third RJ-45 plug as in the case of the T-adaptor, the junction box has the facility to connect individual wires to each wire of the Ethernet cable. From this 8 wire port the four positives are joined and the four negatives are joined so as to form a two wire DC current source that is directly connected to LED strips. In a further optional embodiment, the second RJ-45 plug 306 can be removed together with T adaptor 308 making the light a regular single connection light fitting. In that embodiment, POE splitter 312 can be used or a similar junction box can be used to strip the wires out of the Ethernet connection coming from RJ-45 plug 304 to directly connect to the LED strips as previously described. In all of these embodiments 10 W 48V strips can be used in parallel or alternatively two 10 W 24V LED strips can be used in series (not shown).

Figure 21:
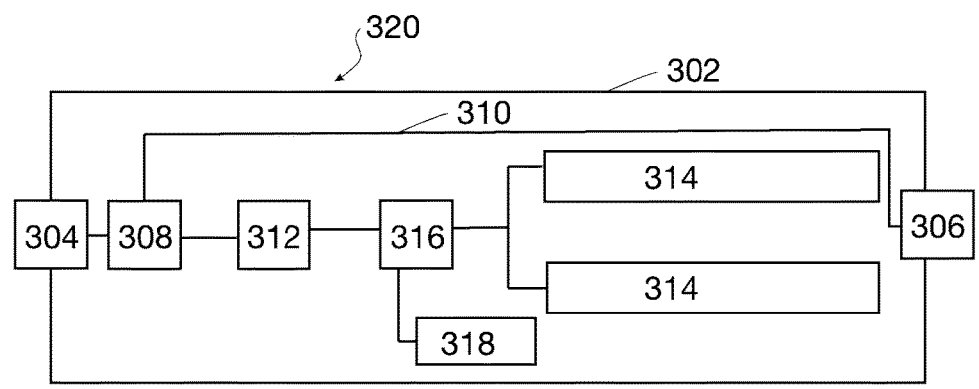
FIG. 21 is a schematic of a maintained Ethernet POE lighting fixture component of a system of the second aspect of the invention.

FIG. 21 shows LED light 320 which is a maintained version of the Ethernet LED light fixture of FIG. 20. It has the same components except that it also has an inverter 316 (DF268H LED lamp Automatic Emergency Device-Dengfeng Ltd) and battery 318 (DFDY LIR 7.2Hr 2500 mAh). Inverter 316 detects when power from the Ethernet connection ceases and for charging wherein the battery 318 and inverter 316 operate in conjunction to provide emergency power when POE power is cut. Because the light can be turned off remotely, testing the unit involves turning off the power to the light to see if the emergency battery power illuminates the LED strips 314, albeit at a reduced brightness. The same optional embodiments apply in that second RJ-45 plug can be removed together with the T junction as well as optionally removing the POE splitter and feeding the LED strips with power derived by joining all of the positive and negative wires together to form a two wire power supply.

Figure 22:
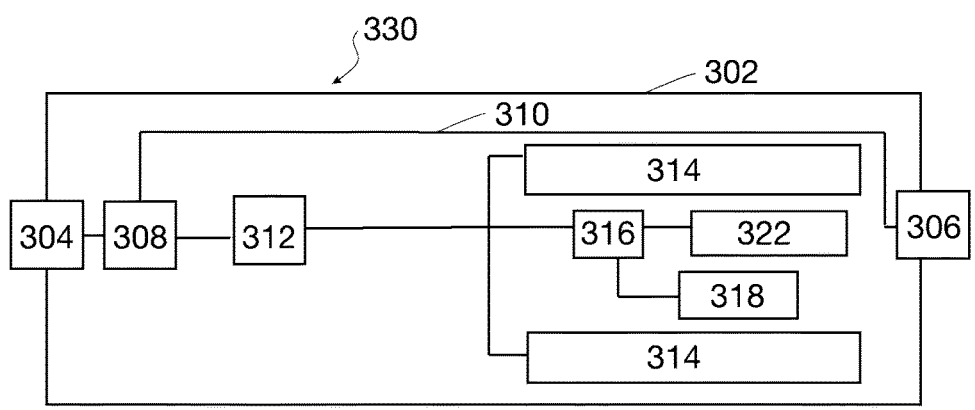
FIG. 22 is a schematic of a sustained Ethernet POE lighting fixture component of a system of the second aspect of the invention.

FIG. 22 shows a LED light fitting 330 which is a sustained version of the light fitting depicted in FIG. 21. In this embodiment the inverter 316 powers emergency LED's 322 when Ethernet power is detected as having been cut off rather than the main LED's 314. Testing these lights involves the same process as turning off the power to the light to see if the emergency LED's 322 shine.

Figure 23:
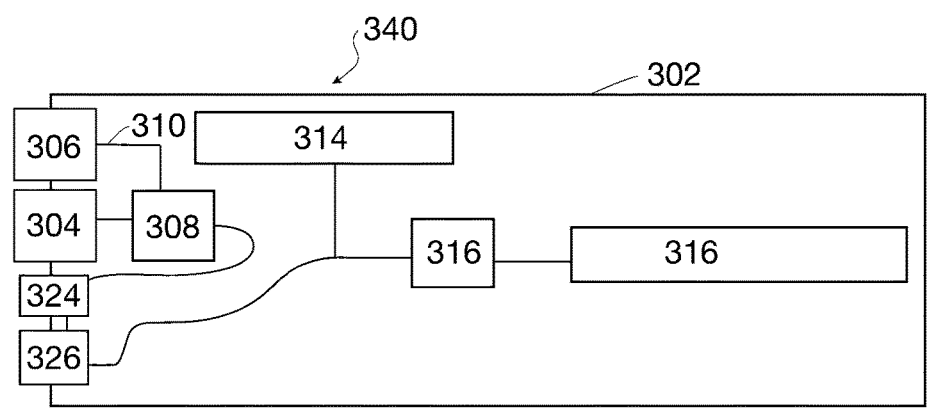
FIG. 23 is a schematic of a second embodiment of a sustained POE Ethernet light fixture component of a system of the second aspect of the invention.

Turning to FIG. 23 there is depicted maintained emergency light 340. It is similar to LED light 320 but for the additional test button 324 and LED 326. When test button 324 is depressed it breaks the circuit and the Ethernet power is no longer supplied causing the LED light to turn off. However if inverter 316 and battery 218 are working properly, the LED strips 314 will continue to shine. The test button and LED light can be used with any of the sustained or maintained LED lights 320 and 330 discussed above. For more advanced testing capabilities an inverter having self test capabilities should be employed such as the inverter DF518T manufactured by Shenzen Dengfeng Power Supply Company. It is programmed to monitor and the fitting and discharge the battery at predetermined intervals and then 'report' a pass or failure via a signal on the LED indicating charging light. Again the other optional embodiments also apply here including removing the second RJ-45 plug and also removing the POE splitter and simply hard wiring the 4 positives and 4 negative wires of the Ethernet cable into the power supply of the LED strips 314.

Ethernet LED lights 300, 320, 330 and 340 all employ constant voltage LED strips. If it is desired to provide lights utilising constant current LED strips this can be accommodated within the designs depicted in FIGS. 20 to 23 by including an upstream DC-DC step down convertor which converts the source of power to power the LED strips 314 (and 322) into a source of constant current as opposed to constant voltage. Again these can be provided with or without the second RJ45 and without the POE splitter when the wires of the cable are hard wired to form a DC power source.

Figure 24:
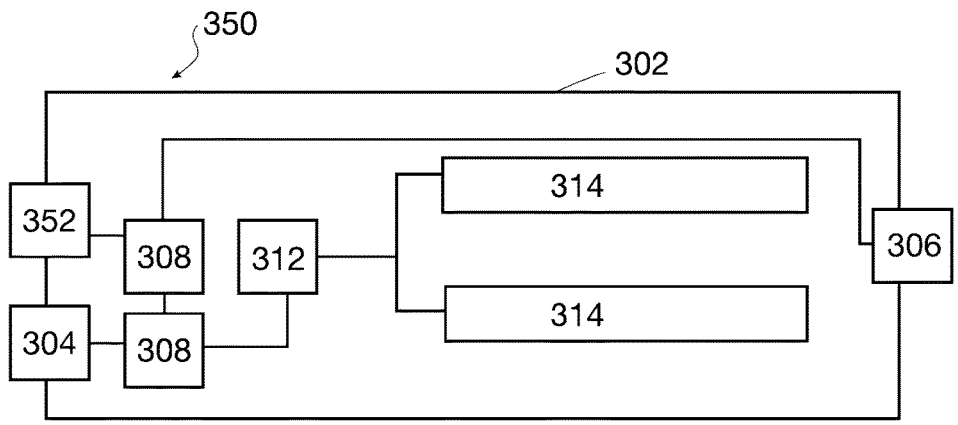
FIG. 24 is a schematic of a further embodiment of a non-maintained POE Ethernet lighting fixture component of a system of the second aspect of the invention.
Figure 25:
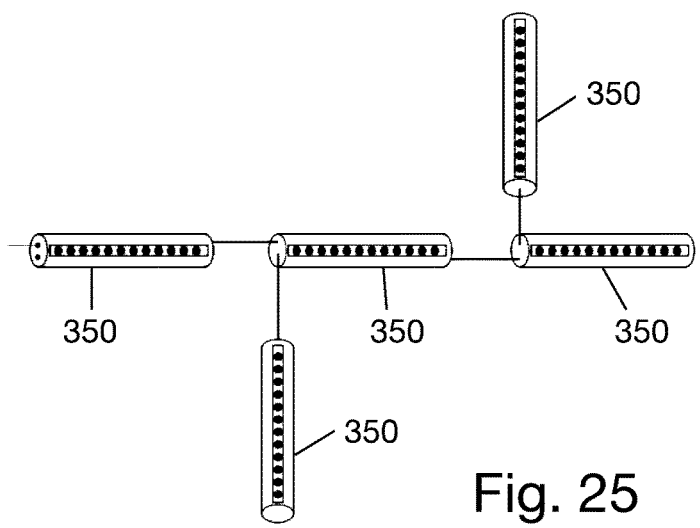
FIG. 25 is a schematic of a light fixture array utilising the light fixture of FIG. 24.
Figure 26:
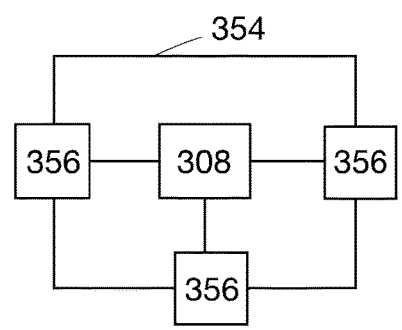
FIG. 26 is a schematic of a T junction box component of a system of the second aspect of the invention.
Figure 27:
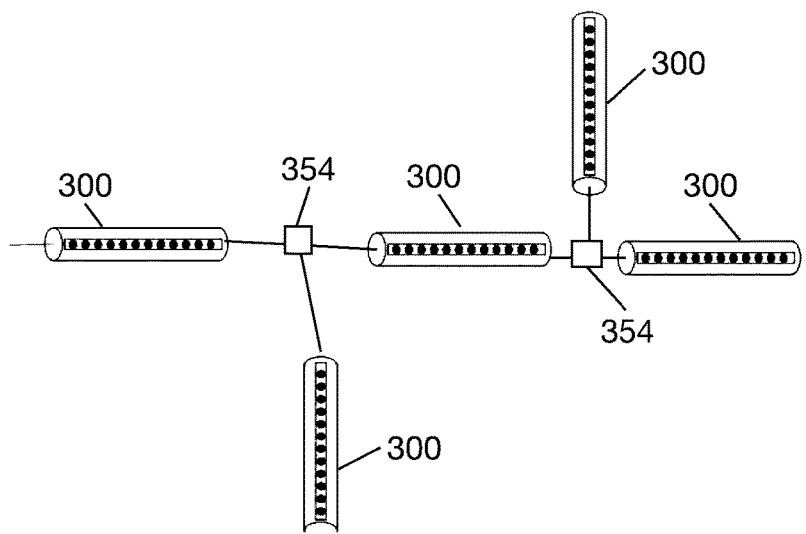
FIG. 27 is a schematic of a light fixture array using the T junction box of FIG. 26.

Turning to FIG. 24 an alternative embodiment of a daisychainable LED light fixture 350 is shown. The main difference to LED light fixture 300 from FIG. 20 is that it contains an extra Ethernet T adaptor 308 and an extra IP65 rated Ethernet port 352 mounted in the housing 302 so that each light fixture has one power input and two power outputs. This allows for the LED light fixture 350 to be arranged in a branching pattern as set out in FIG. 25. As an alternative to using LED light fixtures 350, one or more T box's 354 can be provided as depicted in FIG. 26. The T box has three IP65 rated Ethernet ports 356 contained within an IP65 rated enclosure that has inside of it, an Ethernet T adaptor 308. Together with daisychainable LED light fixtures 300 (or any variations thereof, not shown), they can form a branched array of LED light fixtures as shown in FIG. 27.

Figure 28:
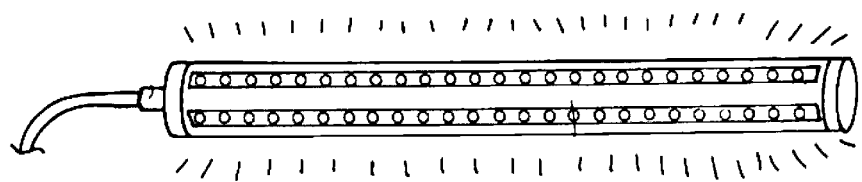
FIG. 28 is a depiction of a batten style sustained light fixture component of a system of the second aspect of the invention in full illumination mode.
Figure 29:
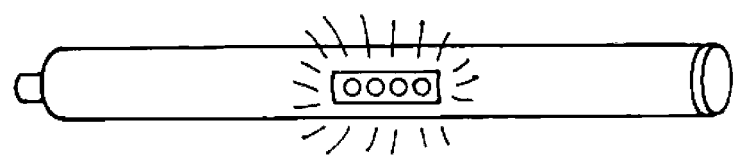
FIG. 29 is a depiction of the light fixture of FIG. 28 in emergency mode.
Figure 30:
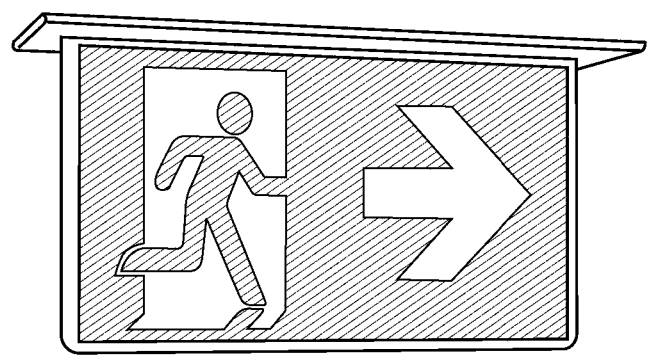
FIG. 30 is a depiction of an emergency light form factor.
Figure 31:
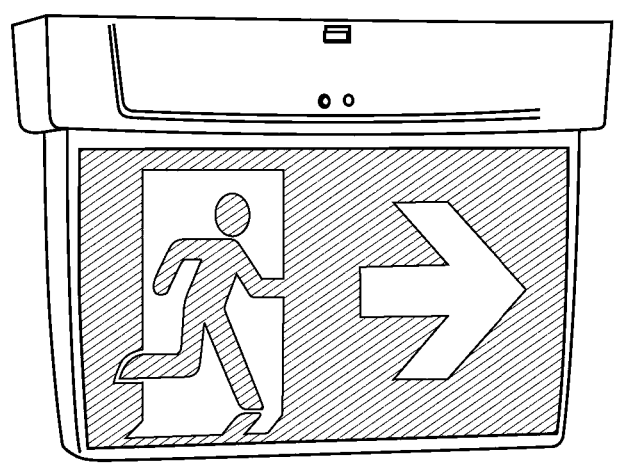
FIG. 31 is a further depiction of an emergency light form factor.
Figure 32:
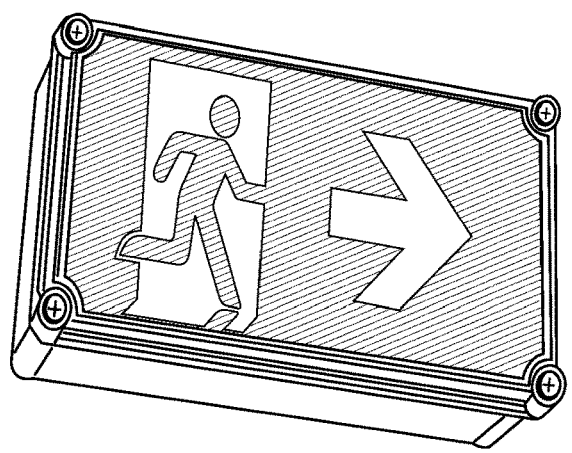
FIG. 32 is a still further depiction of an emergency light form factor.
Figure 33:
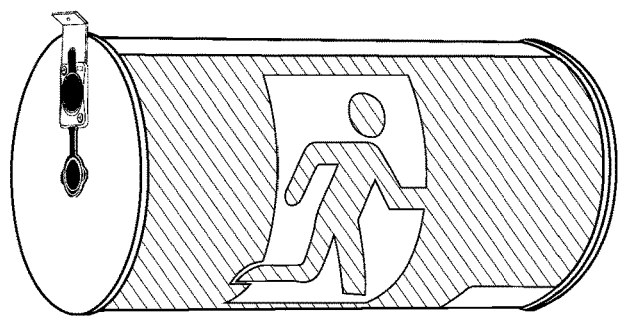
FIG. 33 is a further depiction of an emergency light form factor.
Figure 34:
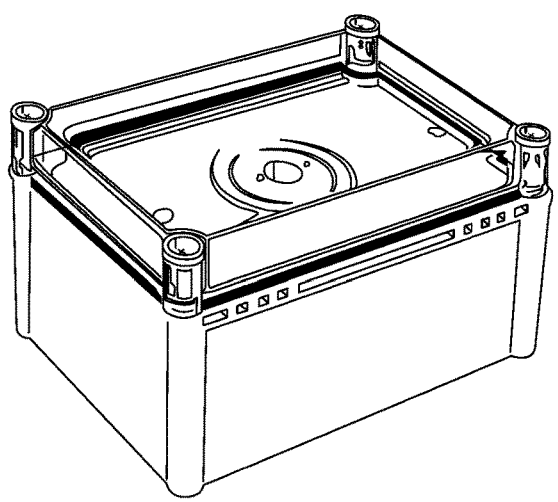
FIG. 34 is a depiction of an embodiment of a downright light fixture form factor.
Figure 35:
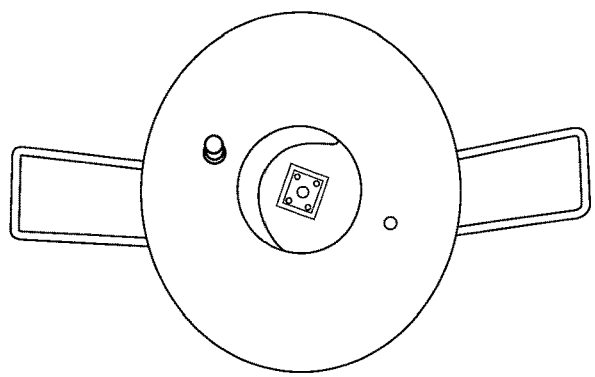
FIG. 35 is a depiction of an embodiment of a downright light fixture form factor.

Ethernet LED lights 300, 320, 330, 340 and 350 can all be produced in a number of different form factors including emergency exit lights. In FIG. 28 a sustained LED light fixture 330 is shown in normal operation. It takes the form of a 4 foot cylindrical batten style light. In FIG. 29 it is shown with power cut off, with only the emergency LED's shining. FIGS. 30, 31, 32 and 33 depict alternative form factors, particularly suited for sustained and maintained emergency lighting where the light must take the form factor of an emergency exit light. FIGS. 34 and 35 show downlight form factors which are also suitable for sustained and maintained components.

Figure 36:
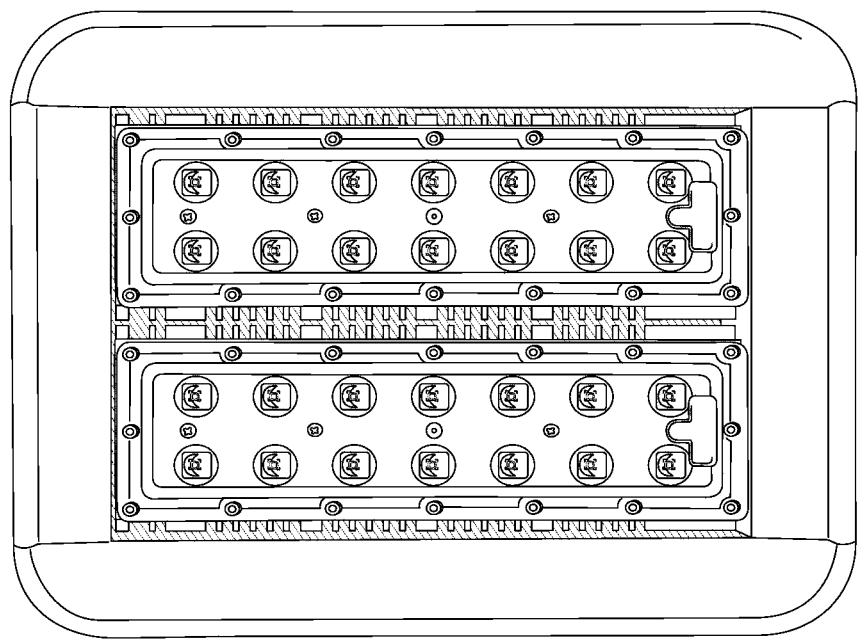
FIG. 36 is a depiction of a front view of a floodlight light fixture form factor.
Figure 37:
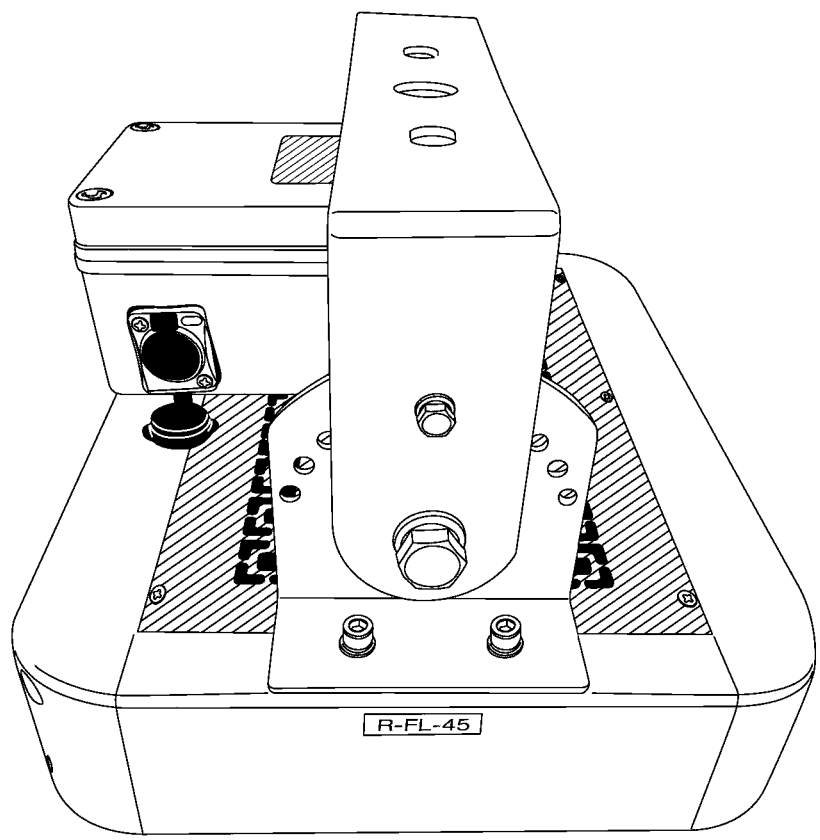
FIG. 37 is a depiction of a rear side view of a floodlight light fixture form factor.

The low bay floodlights depicted in FIGS. 36 and 37 have a constant current LED bank consuming 40 W of power. The same form factor can be used with two or three banks of LED's consuming 80 W and 120 W in total which is under the 150 W that can be delivered by the Tycon power injectors. Each bank of LED's would have a DC-DC step down convertor upstream of each LED bank. The low bay floodlight depicted in FIGS. 36 and 37 is rated for outdoor use with an IP rating of at least IP67.

Inverter Technology

The inverter technology employed in both charging station 216 and 240V conversion module 228 is based around the core technologies of inverting a low voltage DC current into a high voltage AC current.

Charging station 216 is provided with the main purpose of supplying 240V AC power to locations remote from station 10 via a plurality of low voltage, high power POE connections. By eliminating large spans of 240V AC power, the chance of accidental death from electrocution is diminished significantly. Referring to FIG. 10 four Ethernet cables 218 are connected to high power inputs on the charging station 216 and to a corresponding number of high power Ethernet outputs on station 10. The plurality of low voltage high power connections 218 provide sufficient power to be transformed into 240 AC power for distribution through GPO outlets 220. The 240 AC power can also be used to power a plurality of USB ports 226 for charging smartphones, tablets and other smaller devices. In addition Ethernet ports for data connectivity can be supplied to the charging station from the data connection extracted from the plurality of POE connections 218.

Figure 38:
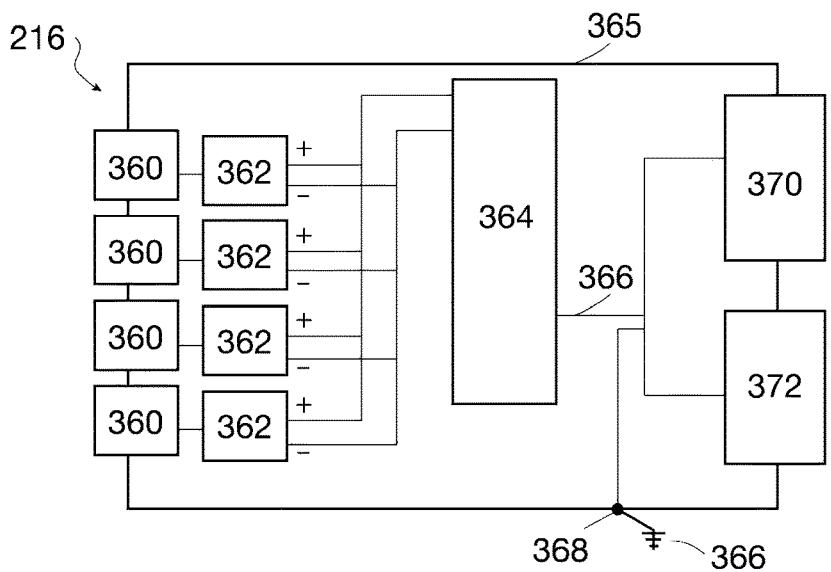
FIG. 38 is a schematic view of the components of the charging station component of a system of the second aspect of the invention.
Figure 39:
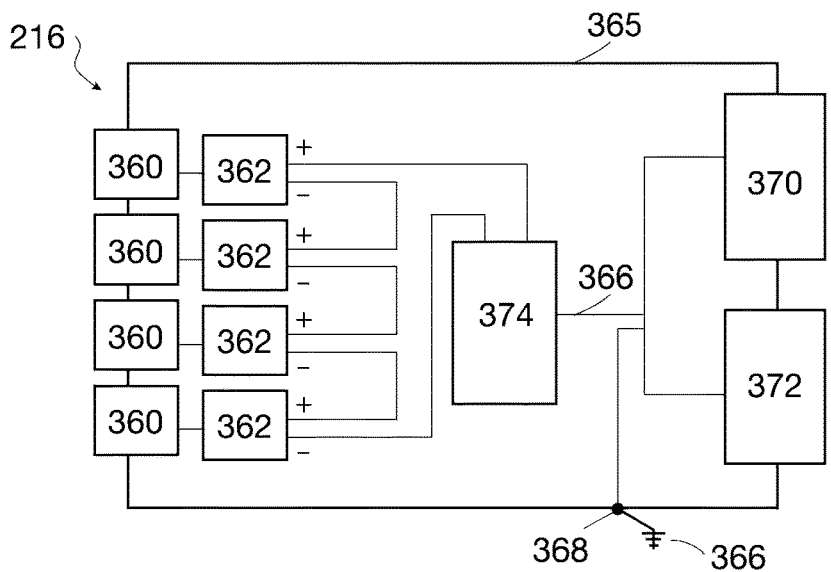
FIG. 39 is a schematic view of the components of the charging station component of a system of the second aspect of the invention.
Figure 40:
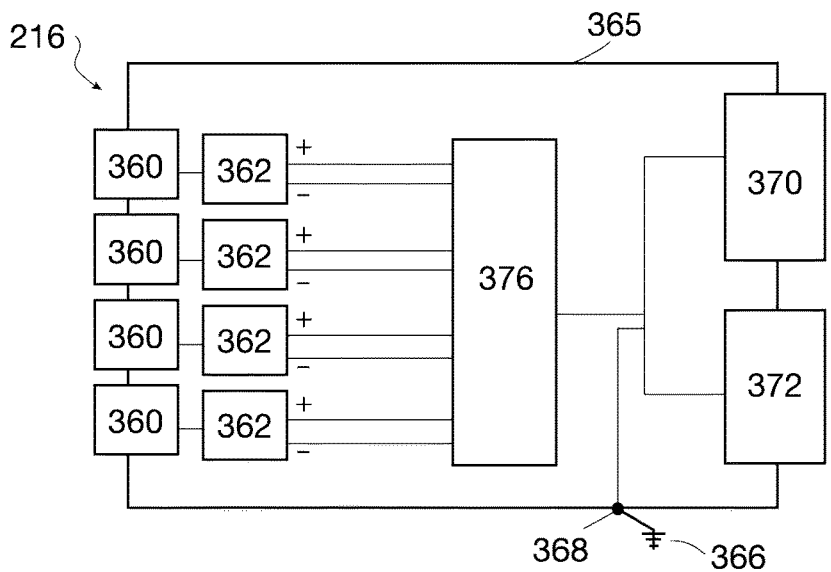
FIG. 40 is a schematic view of the components of the charging station component of a system of the second aspect of the invention.

Turning to FIGS. 38, 39 and 40 there are schematics depicted for alternative embodiments of charging stations 216. Common to all embodiments of the charging station are four high power IP65 rated Ethernet ports 360 mounted into the IP65 rated chassis 365. They each receive a 150 W high power POE power supply from station 10 (which is derived from the Tycon POE splitter—POE-INJ-1000-DINx). Together four connections provide 520 W worth of power for use by devices connected to the charging stations (alternatively higher powered injectors in the main station can be used to increase power, for example the EnableIT 200 W per channel injector could be used to deliver 800 W over four connections or again alternatively more than 4 connections could be used to increase the power capacity of the charging station).

Each Ethernet port 350 is connected to individual POE splitters 362 which output the POE DC current at between 36V and 56V over positive and negative outputs. In charging station 216 these outputs are connected in parallel and fed into an inverter 364 which converts the low voltage DC outputs into a high voltage AC output of 366. Optionally you can include a 30 mA residual current device for added safety to the 240V AC outputs of the inverter 364. Together with a ground connection 366 formed by a conducting bolt 368 connected to the chassis 365, the high voltage AC power is supplied to general power outlets 370. This high voltage power can be used by tradesman wishing to use the power to operate machinery and tools. The 240V AC power can also be supplied to USB charging station 372 which incorporates its own transformer so that phones, tablets and other devices powered by USB (including wireless devices and extenders) can be powered remotely from the station 10.

The only significant difference between charging station 216 in FIG. 38 and FIG. 39 is that the charging station 216 in FIG. 9 the outputs of the POE splitters are connected in series and it employs an inverter 374 which takes the high voltage DC output and transforms it into high voltage 240 AC output.

Similarly, the only significant difference between charging station 216 in FIG. 40 and the earlier charging stations 216 is that the outputs of the POE splitters are connected directly and independently to inverter 376 which has 4 independent low voltage DC inputs that do not need to be load balanced. Such an inverter is provided by CyboEnergy—namely a CyboInverter (CI-Mini-100Te) which can accept DC voltages between 15V and 58V with a maximum power rating of 300 W per input. It outputs 240V AC at up to 1150 W (5 A). In the present embodiment the inverter 216 could provide up to 1150 W (5 A) if 8 150 W/channel POE midspan connections are utilised. That is if two POE connections are patched into each of the four inputs.

Turning now to 240 Conversion Module 228 as depicted in FIG. 10. This module 228 runs on the same principle as the charging station 216. However the conversion module 228 does not have any power points of any kind as an output. Rather it has softwiring connectors provided on the enclosure to the device which other softwiring adaptors use to make a connection to bring the high voltage power made available by the device to various power boards and distribution devices.

Figure 41:
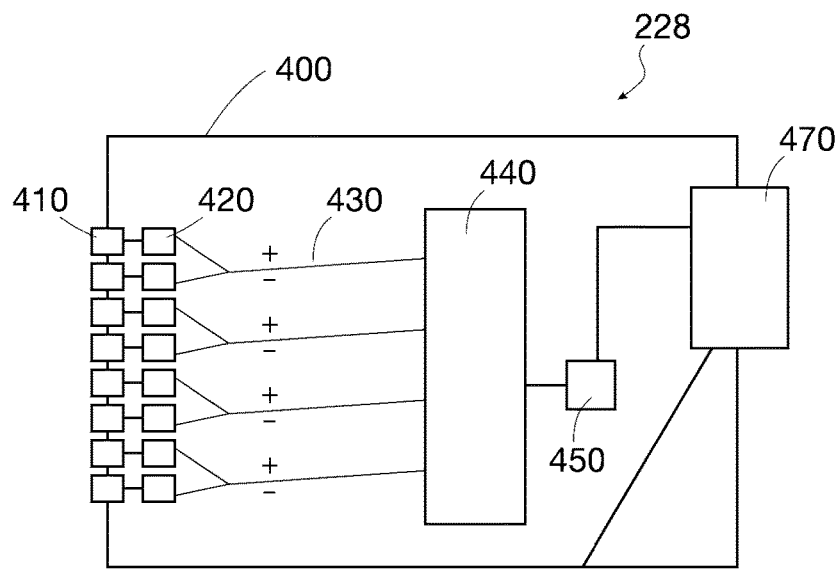
FIG. 41 is a schematic view of a first embodiment of the conversion module component of a system of the second aspect of the invention.

Turning to FIG. 41 there is a schematic for the module 228 which incorporates the same inverter as depicted in FIG.

Figure 42:
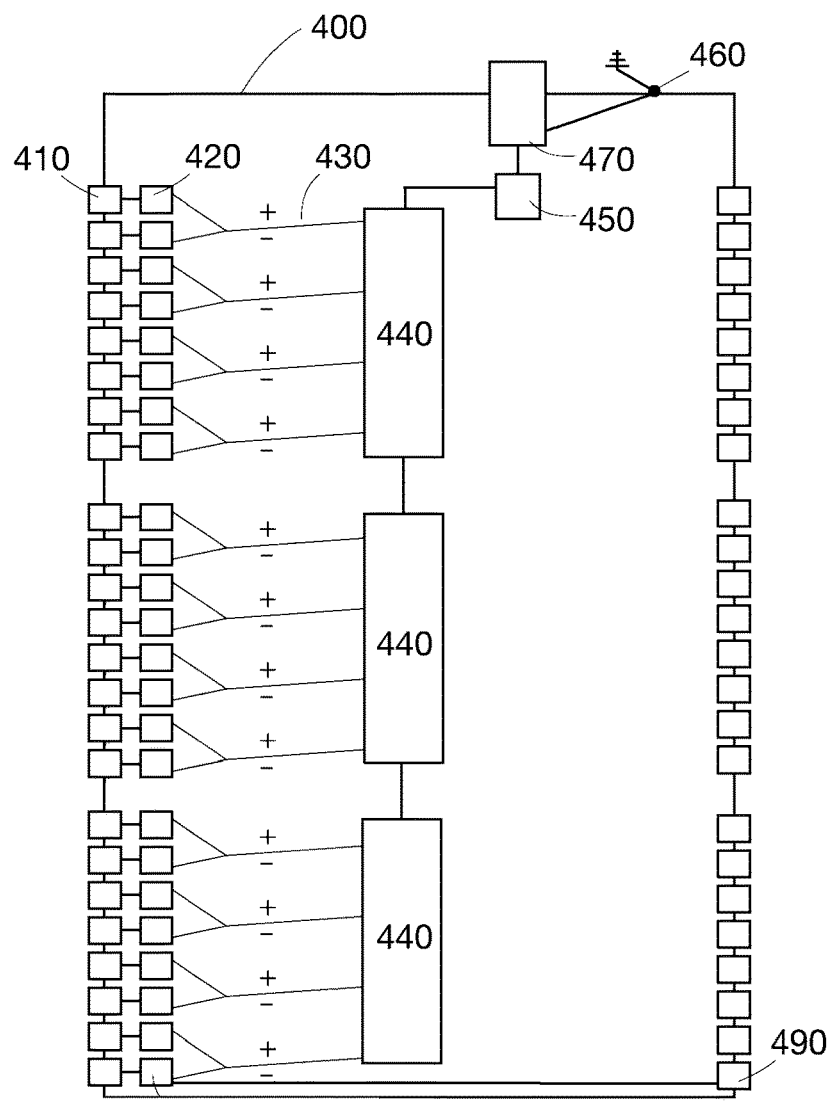
FIG. 42 is a schematic view of a second embodiment of the conversion module component of a system of the second aspect of the invention.

40, namely the CyboEnergy CI-Mini-1000Te inverter. Plugging in 4 150 W high power Ethernet connections would yield approximately 2.5 A of 240V power which is approximately half the capacity of the inverter. To reach full capacity there would need to be approximately 8 high power 150 W POE connections. These can be utilised as shown in the schematic which shows IP65 rated RJ-45 plugs 410 in IP65 rated enclosure 400. These pass the POE connection to POE splitter 420. POE splitter 420 splits the DC power from any data connection contained on the POE connection and the DC power is aggregated with the DC power from an adjacent POE splitter and the combined power is applied to inverter input 430. The inverter 440 then transforms the power into AC 240V power and passes that to RCD device 450 which in turn passes the power to softwiring adaptor 470. Separated data/Ethernet connection from POE splitter 420 can be output through RK-45 jacks in the enclosure 400 (not shown). Module 228 also has a lug or bolt for the connection of an earth which is passed through to the softwiring adaptor 470 for use as the earth in the three wire high voltage power source. Multiple inverters of the sort mentioned above can be connected in series as shown in FIG. 42. 24 high power POE connections are introduced into RJ45 jacks 410 and up to 15 A of 240V power can be realised from these connections via softwiring adaptor 470. 24 data connections are also available for use locally via RJ-45 outputs 480 (where only one connection between it and POE injector 420 is shown).

Modules 228 can be installed throughout the building where 240V power (or 110V power) is required. This obviates the remaining reason for running high voltage cables throughout a building. No separate cable trays need to be provided for data and high voltage as they can now be run throughout the building together along the one set of cables. The soft wiring adaptor such as those produced by CMS Electracom are useful for providing general power points and also panels in which Ethernet connections can also be patched in so that both power and data is available for users.

The invention claimed is:

1. A mobile power distribution station comprising at least one weatherproof enclosure, wherein the at least one weatherproof enclosure comprises:
   a low voltage power over Ethernet power source, and
   a patch panel including a plurality of weatherproof RJ-45 jacks, wherein at least one RJ-45 jack of the patch panel provides at least 100 W of available low voltage DC power from the low voltage power over Ethernet power source for transmission to at least one device connected thereto via a Cat cable.

2. The mobile power distribution station of claim 1, wherein at least one RJ-45 jack of the patch panel provides a minimum of 150 W of available low voltage DC from the low voltage power over Ethernet power source power for transmission to at least one device connected thereto.

3. The mobile power distribution station of claim 1, wherein at least one RJ-45 jack of the patch panel provides a minimum of 200 W of available low voltage DC power from the low voltage power over Ethernet power source for transmission to at least one device connected thereto.

4. The mobile power distribution station of claim 1, wherein the low voltage power over Ethernet power source comprises one or more POE enabled switches, routers or high powered midspan devices.

5. The mobile power distribution station of claim 4, further comprising a PC/microprocessor connected to a POE enabled switch of the one or more POE enabled switches, wherein the PC/microprocessor is adapted to control at least one device connected to an RJ-45 jack of the patch panel via the POE enabled switch.

6. The mobile power distribution station of claim 5, wherein the PC/microprocessor is configured to control the at least one device connected to the RJ-45 jack by, at least, powering and depowering the at least one device by altering the powered state of the RJ-45 jack.

7. The mobile power distribution station of claim 6, further comprising an I/O module adapted to receive sensor input from at least one sensor, wherein the at least one sensor is connected to at least one RJ-45 jack of the patch panel, and wherein the PC/microprocessor utilizes the sensor information to control the operation of the at least one device.

8. The mobile power distribution station of claim 7, wherein the at least one sensor is selected from a group consisting of motion sensors (PIR), CO, Temperature, Smoke, Fire or gas detectors.

9. The mobile power distribution station of claim 4, wherein at least one RJ-45 jack of the patch panel is configured to receive a data network connection and supply it to at least one POE enabled switch of the one or more POE enabled switches.

10. The mobile power distribution station of claim 5, further comprising a wifi access point and/or a telecommunications module to enable communications between the PC/microprocessor and one or more wireless devices, wherein the one or more wireless devices are to provide instructions to the PC/microprocessor for controlling one or more devices of the at least one device connected to the RJ-45 jack of the patch panel.

11. The mobile power distribution station of claim 10, wherein the one or more wireless devices access a control interface generated by the PC/microcontroller.

12. The mobile power distribution station of claim 1, wherein the at least one weatherproof enclosure includes a main enclosure for configurable electrical components of the station and a patch panel enclosure for accessing the patch panel.

13. The mobile power distribution station of claim 12, wherein the main enclosure is not user accessible and the patch panel enclosure is lockable to prevent Cat cables being swapped around the plurality of weatherproof RJ-45 jacks.

14. The mobile power distribution station of claim 12, further comprising handles, wheels or castors for moving the station and optionally a mounting bracket for mounting the station on a wall or vertical structure.

15. A power and lighting distribution system comprising:
   a weatherproof POE station comprising at least one weatherproof enclosure containing:
      (a) a low voltage power over Ethernet power source, and
      (b) a patch panel including a plurality of weatherproof RJ-45 jacks, wherein at least a subset of the plurality of weatherproof RJ-45 jacks provide low voltage DC power to devices connected thereto; and
   one or more driverless Ethernet LED light fixtures connected to a weatherproof RJ-45 jack of the plurality of weatherproof jacks via a Cat cable, wherein the one or more driverless Ethernet LED light fixtures include at least one LED module and at least one RJ-45 jack, wherein the at least one LED module is powered and controlled by the low voltage DC power provided by the weatherproof RJ-45 jack.

16. The power and lighting distribution system of claim 15, wherein at least one driverless Ethernet LED light fixture of the one or more driverless Ethernet LED light fixtures is a maintained light fixture comprising an inverter, battery and one or more LED modules and wherein the inverter is configured to supply power from the battery when there is a loss of power supplied by the POE connection.

17. The power and lighting distribution system of claim 15, wherein at least a first driverless Ethernet LED light fixture of the one or more driverless Ethernet LED light fixtures includes a second RJ-45 jack for daisy chaining and powering at least a second driverless Ethernet LED light fixture of the one or more driverless Ethernet LED light fixtures.

18. The power and lighting distribution system of claim 15, further comprising:
at least one digital addressable lighting interface (DALI) Ethernet LED light fixture connected to a weatherproof RJ-45 jack of the plurality of weatherproof jacks via a Cat cable, wherein a DALI Ethernet LED light fixture includes at least one LED module, at least one RJ-45 jack, and a DALI driver that controls the at least one LED module, wherein:
the POE station is adapted to receive a DALI control signal and overlay it over the low voltage DC power provided via the weatherproof RJ-45 jack; and
the DALI driver is configured to be addressed by the DALI control signal and control operation of the at least one LED module via conventional DALI commands.

19. A power distribution system comprising:
a high power weatherproof POE station comprising at least one weatherproof enclosure containing:
(a) a low voltage power over Ethernet power source, and
(b) a patch panel including a plurality of weatherproof RJ-45 jacks, wherein at least a subset of the weatherproof RJ-45 jacks provide low voltage DC power to devices connected thereto; and
a charging station for outputting, at least, high voltage AC power, wherein the charging station includes a plurality of RJ-45 jacks and an inverter, wherein each of the plurality of RJ-45 jacks is utilized to receive low voltage DC power from a weatherproof RJ-45 jack in the patch panel via a Cat cable and the inverter is to invert the plurality of low voltage DC power received into the high voltage AC power.

20. A method of providing temporary lighting and/or high voltage power to a construction site, the method comprising:
mounting or installing a high power weatherproof POE station at the construction site, wherein the POE station is comprised of at least one weatherproof enclosure containing:
(a) a low voltage power over Ethernet power source, and
(b) a patch panel including a plurality of weatherproof RJ-45 jacks, wherein at least a subset of the weatherproof RJ-45 jacks provide low voltage DC power to devices connected thereto;
connecting via one or more cat networking cables one or more of the plurality of weatherproof jacks to either or both:
(a) one or more driverless Ethernet LED light fixtures comprising at least one LED module and at least one RJ-45 jack, wherein the one or more driverless Ethernet LED light fixtures are powered and controlled by the low voltage DC power provided by at least one of the weatherproof jacks; or
(b) a charging station for outputting, at least, high voltage AC power, wherein the charging station includes a plurality of RJ-45 jacks and an inverter, wherein each of the plurality of RJ-45 jacks is utilized to receive low voltage DC power from a weatherproof RJ-45 jack in the patch panel and the inverter is to invert the plurality of low voltage DC power received into the high voltage AC power; and
connecting the station to a source of high voltage AC power and powering up associated ones of the RJ-45 jacks to energize the one or more driverless Ethernet LED light fixtures and/or the charging station.

21. The mobile power distribution station of claim 10, wherein the one or more devices of the at least one device connected to the RJ-45 jack that the one or more wireless devices provide instructions for is selected from a group including lights, door locks and/or cameras.

22. The power distribution system of claim 19, wherein the charging station provides at least 400 W of AC power via a general power outlet (GPO).

23. The power distribution system of claim 19, wherein the charging station provides at least 800 W of AC power via a general power outlet (GPO).

24. The power distribution system of claim 19, wherein the charging station includes one or more USB ports for, at least, charging small mobile devices.

\* \* \* \* \*